US 6,680,735 B1

(12) United States Patent
Seiler et al.

(10) Patent No.: US 6,680,735 B1
(45) Date of Patent: Jan. 20, 2004

(54) METHOD FOR CORRECTING GRADIENTS OF IRREGULAR SPACED GRAPHIC DATA

(75) Inventors: Larry D. Seiler, Boylston, MA (US); Yin Wu, Somerville, MA (US); Hugh C. Lauer, Concord, MA (US); Vishal C. Bhatia, Arlington, MA (US); Jeffrey Lussier, Woburn, MA (US)

(73) Assignee: TeraRecon, Inc., San Mateo, CA (US)

( * ) Notice: Subject to any disclaimer, the term of this patent is extended or adjusted under 35 U.S.C. 154(b) by 296 days.

(21) Appl. No.: 09/715,398

(22) Filed: Nov. 17, 2000

Related U.S. Application Data

(63) Continuation of application No. 09/678,550, filed on Oct. 4, 2000.

(51) Int. Cl.⁷ .............................................. G06T 17/00
(52) U.S. Cl. ..................................... 345/424; 345/419
(58) Field of Search ................................ 345/418, 419, 345/424, 421, 423, 426, 427

(56) References Cited

U.S. PATENT DOCUMENTS

| | | | | |
|---|---|---|---|---|
| 6,072,496 A | * | 6/2000 | Guenter et al. | 345/419 |
| 6,208,347 B1 | * | 3/2001 | Migdal et al. | 345/419 |
| 6,236,405 B1 | * | 5/2001 | Schilling et al. | 345/430 |
| 6,256,603 B1 | * | 7/2001 | Celniker | 703/10 |

* cited by examiner

*Primary Examiner*—Cliff N. Vo
(74) *Attorney, Agent, or Firm*—Blakely, Sokoloff, Taylor & Zafman LLP

(57) ABSTRACT

A volume data set composed of voxels is rendered onto an image plane composed of pixels by casting a ray through each pixel of the image plane. A surface of the volume data set is selected as a base plane. Sample points are defined along each ray so that the sample points lie in planes parallel to the base plane. Voxels adjacent to each sample point are sampled to determine a sample value for each sample point, and the sample values of each ray are combined to determine a pixel value for each pixel.

26 Claims, 19 Drawing Sheets

$du \geq 0. dv \geq 0. dw \geq 0$ $$P = \begin{bmatrix} 0 & 1 & 0 & 0 \\ 0 & 0 & 1 & 0 \\ 1 & 0 & 0 & 0 \\ 0 & 0 & 0 & 1 \end{bmatrix}$$

$du \geq 0. dv \geq 0. dw < 0$ $$P = \begin{bmatrix} 0 & 0 & -1 & -1 \\ 0 & 1 & 0 & 0 \\ 1 & 0 & 0 & 0 \\ 0 & 0 & 0 & 1 \end{bmatrix}$$

$du \geq 0. dv < 0. dw \geq 0$ $$P = \begin{bmatrix} 0 & 0 & 1 & 0 \\ 0 & -1 & 0 & -1 \\ 1 & 0 & 0 & 0 \\ 0 & 0 & 0 & 1 \end{bmatrix}$$

$du \geq 0. dv < 0. dw < 0$ $$P = \begin{bmatrix} 0 & -1 & 0 & -1 \\ 0 & 0 & -1 & -1 \\ 1 & 0 & 0 & 0 \\ 0 & 0 & 0 & 1 \end{bmatrix}$$

$du < 0. dv \geq 0. dw \geq 0$ $$P = \begin{bmatrix} 0 & 0 & 1 & 0 \\ 0 & 1 & 0 & 0 \\ -1 & 0 & 0 & -1 \\ 0 & 0 & 0 & 1 \end{bmatrix}$$

$du < 0. dv \geq 0. dw < 0$ $$P = \begin{bmatrix} 0 & 1 & 0 & 0 \\ 0 & 0 & -1 & -1 \\ -1 & 0 & 0 & -1 \\ 0 & 0 & 0 & 1 \end{bmatrix}$$

$du < 0. dv < 0. dw \geq 0$ $$P = \begin{bmatrix} 0 & -1 & 0 & -1 \\ 0 & 0 & 1 & 0 \\ -1 & 0 & 0 & -1 \\ 0 & 0 & 0 & 1 \end{bmatrix}$$

$du < 0. dv < 0. dw < 0$ $$P = \begin{bmatrix} 0 & 0 & -1 & -1 \\ 0 & -1 & 0 & -1 \\ -1 & 0 & 0 & -1 \\ 0 & 0 & 0 & 1 \end{bmatrix}$$

FIG. 10

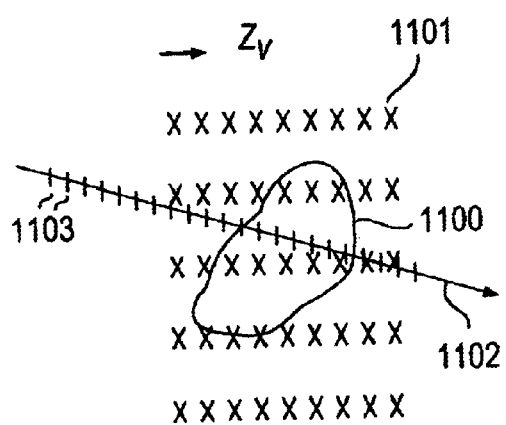 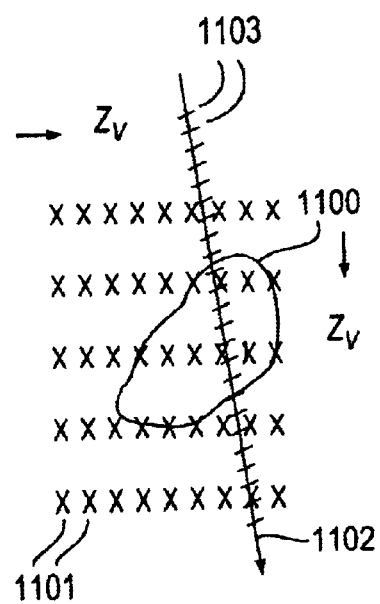
Fig. 11aFig. 11b

METHOD FOR CORRECTING GRADIENTS OF IRREGULAR SPACED GRAPHIC DATA

This application is a continuation of pending application Ser. No. 09/678,550 filed on Oct. 4, 2000.

FIELD OF THE INVENTION

The present invention is related to the field of computer graphics, and in particular to rendering volumetric data sets using a parallel pipelined hardware rendering engine.

BACKGROUND OF THE INVENTION

Volume rendering is often used in computer graphics applications where three-dimensional data need to be visualized. The volume data can be scans of physical or medical objects, or atmospheric, geophysical, or other scientific models where visualization of the data facilitates an understanding of the underlying real-world structures represented by the data.

With volume rendering, the internal structure, as well as the external surface features of physical objects and models are visualized. Voxels are usually the fundamental data items used in volume rendering. A voxel is data that represent a particular three-dimensional portion of the object or model. The coordinates (x, y, z) of each voxel map the voxels to positions within the represented object or model.

A voxel represents one or more values related to a particular location in the object or model. For a given prior art volume, the values contained in a voxel can be a specific one of a number of different parameters, such as density, tissue type, elasticity, or velocity. During rendering, the voxel values are converted to color and opacity (RGBα) values, according to the voxel intensity values, which can be projected onto a two-dimensional image plane for viewing.

One frequently used technique during rendering is ray-casting. There, a set of imaginary rays are cast through the voxels. The rays originate from some view point or image plane. The voxels are sampled at points along the rays, and various techniques are known to convert the sampled values to pixel values. In either case, processing of the volume may proceed in a back-to-front, or front-to-back order.

One traditional technique of ray-casting for volume rendering is based on a shear-warp algorithm of Lecroute and Levoy, see Lacroute and Levoy, *"Fast Volume Rendering Using a Shear-Warp Factorization of the Viewing Transformation,"* Computer Graphics, 28(4), 451–458, August 1994.

That technique has the advantage of stepping through a volume data set in an order closely related to the order in which the voxels are stored. This order is called "object order." Object order has two advantages. It allows volume memory to be accessed in an optimal way, and it requires only three multiplications by interpolation weights to determine a sample value. As a result, volume data can be fetched and processed at a maximum rate. It was this ray casting technique that first made real-time, interactive volume rendering possible.

The shear-warp technique achieves its performance by casting rays according to a grid defined by the voxels on a "base plane" of the volume data set. The base plane is a plane parallel to a face or surface of the volume most nearly parallel to the image plane. In the shear-warp technique, rays cast through the volume are positioned on a grid of rows and columns parallel to the rows and columns of voxels in the volume itself. This orderly row-and-column arrangement is what makes object order rendering efficient, particularly for memory accesses and interpolating sample values.

However, the resulting image is aligned to the base plane, and not to the image plane. Moreover, except in special cases, the resulting base plane aligned image is distorted from the desired, final image of the volume object. Therefore, the shear-warp technique is really a two-stage technique, the first stage, called the "shear" stage", renders the image to the base plane while the second stage, called the "warp" stage, undistorts the base plane image and positions it correctly onto the image plane.

The warp stage is, in effect, a resampling of the base plane image to produce the final image on the image plane. As a result, there is, in any practical implementation, a degradation of image quality from what could be obtainable.

The warp stage is not difficult, and it can easily be accomplished using, for example, the texture map functions of a conventional 3D polygon graphics system such as OpenGL™. However, not all application environments are designed for systems that include such graphics capability. In those cases, the need to perform the warp stage requires a cumbersome addition to the system design or an extra software module with challenging performance requirements. Either way, complexity of the system is increased.

An alternate method of ray-casting is known as "image order." In this method, rays are cast through the volume data set from pixels on the final image plane. This produces a correct image directly, without distortion and without the warp stage. The resulting image is typically of a higher quality than can be obtained from the shear-warp technique. The reason that image order rendering produces higher image quality is that each pixel on the final image plane is generated directly from the single ray that passes through it. In object order, by contrast, each pixel in the final image plane is synthesized from a number of nearby pixels on the base plane image. Hence, in object order there are two instances of resampling to degrade the quality of the image.

However, image order rendering comes with a penalty. Volume data cannot be fetched as efficiently from memory as with the shear-warp technique. Also, interpolating sample values takes seven multiplications by interpolation weights, instead of the three multiplications required in object order. Therefore, image order methods are significantly slower than object order techniques, so much so, that the real-time interactive volume rendering is not possible but for the smallest volume data sets. Practical interactive applications, such as real-time medical imaging, are very difficult, if not impossible, with prior art image order techniques.

Another issue in rendering concerns embedded images of polygon objects and other objects. With the image order rendering method, embedding such objects and images is straightforward. The objects are simply drawn with a traditional 3D graphics system onto the image plane at the same pixel resolution as the final volume rendered image. There is no resampling of the embedded polygons or images, and therefore, no loss of image quality as a result of the embedding.

In contrast, because the object order volume rendering technique (shear-warp) generates a distorted image on a base plane, the embedded objects must also be drawn with an equivalent distortion on the base plane. The rendered image with the embedded polygons is then warped during the warp stage to the final image. This warp stage seriously deteriorates the image quality of the drawn polygons, especially when the embedded geometry includes sharp edges.

It would be desirable to obtain the superior quality of image order volume rendering while enjoying the superior performance of object order rendering.

SUMMARY OF THE INVENTION

The invention provides a system and method for rendering a volume data set composed of voxels onto an image plane composed of pixels by casting a ray through each pixel of the image plane. A surface of the volume data set is selected as a base plane. Sample points are defined along each ray so that the sample points lie in planes parallel to the base plane. Voxels are fetched from volume memory in slices parallel to the base plane to enhance performance. Voxels adjacent to each sample point are interpolated to determine a sample value for each sample point, and the sample values of each ray are combined to determine a pixel value for each pixel.

BRIEF DESCRIPTION OF THE DRAWINGS

FIG. 10 shows eight permutation matrices;

FIGS. 11a–b are two views of a cross-section of an anisotropically sampled volume data set;

DETAILED DESCRIPTION OF THE PREFERRED EMBODIMENT

Figure 1A:
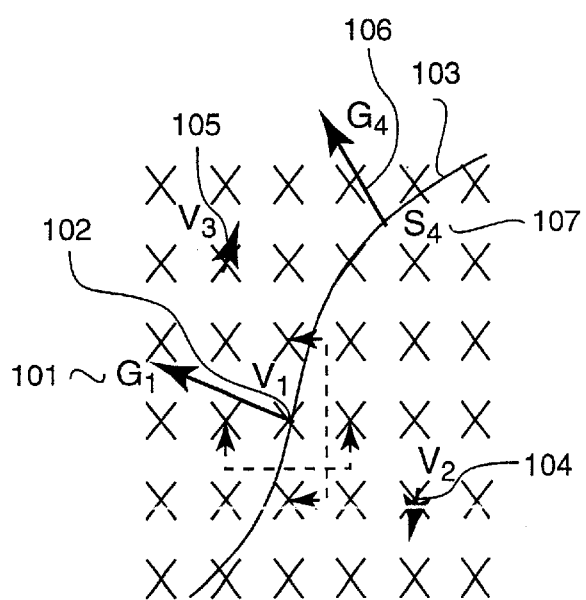
FIGS. 1a–b are a graph of estimating gradients for voxels; the coordinates system according to the invention.

Our invention provides a system and method for rendering a volume data set composed of voxels as pixels in an image plane. The invention uses a ray-casting technique where a ray is cast through each pixel of the image plane. One surface of the volume is selected as a base plane. Sample points are defined along each ray so that the samples are arranged in planes parallel to the selected base plane. Voxels adjacent to each sample point are interpolated to determine sample values. The sample values of each ray are combined to determine a pixel value for each pixel in the final image. We call this methodology xy-image order rendering.

We first describe some general concepts used by the xy-image order volume rendering according to our invention. Then, we describe various coordinate systems and transformations used by our pipelined volume rendering system, and last we describe a preferred hardware implementation for a rendering system that uses the xy-image order rendering according to the invention.

Introduction

Volume rendering is the display or visualization of a volume data set onto a computer terminal, printed page, or other type of two-dimensional visual medium, hereinafter "image plane." A volume data set is a three dimensional array of data values associated with points in a three dimensional space. Each data value in the volume data set is a quantum of information called a volume element, or "voxel." In most cases, the volume data set represents a three dimensional object in the real world, and its associated coordinate system represents the three dimensional physical space occupied by the object. However, volumes can also be models of imaginary objects.

The information in each voxel typically represents one or more characteristics of the object and describes those characteristics for a small region of the space in the immediate vicinity of the voxel, for example, the density of human tissue in a CT scan, the velocity of a fluid in a hydrodynamic model, or the color associated with that position. In general, the data of a voxel may be a scalar or a vector. A sequence of volume data sets can represent a time-varying object. Each member of such a sequence is a three dimensional volume data set in its own right viewed at different instances in time.

The voxels are arranged according to some spatial pattern, the simplest being a rectilinear data set, that is, three-dimensional grid with axes at right angles to each other in physical space. Examples of rectilinear data sets include 3D reconstructed medical data, simulated data sets from computational fluid dynamics or computed finite element models, to name just a few. The volume data can then be represented as a three dimensional array in computer memory, and the location of each voxel in the object corresponds directly to the coordinates of its voxel in the memory array.

Grids

In an isotropic grid, the spacing between voxels is the same in all three dimensions in physical space. In an anisotropic grid, the spacing between the voxels is constant within a given dimension but may be different from one dimension to another. Anisotropic data occur frequently in medical applications where resolution of a CT or MRI scan in the longitudinal direction can be controlled independently of the resolutions in the other two directions.

With sheared grids, the axes of the grid are not at right angles in the physical world of the object. These are also common in medical applications, where the data sets are called gantry-tilted volume data sets. Sheared grids can occur when the sensors of a CT scanner, for example, pass over the body at other than right angles to a longitudinal axis.

In a preferred embodiment, the volume data can have up to $2^{16}$ voxels in any dimension with 8-, 16-, or 32-bit voxels. Other sized volumes and voxels are also possible. Voxels of the volume data set may have multiple component fields, each field representing a different characteristic of the object. The sizes, positions, and formats of voxels may be specified at run-time via a voxel format descriptor.

It is common in the art to use an n-bit value to represent numbers in the range 0.0 . . . 1.0 inclusive. For example, an 8-bit alpha opacity field contains values from 0 . . . 255 to represent opacities from 0.0 (fully transparent) to 1.0 (fully opaque). These numbers are here referred to as repeating fractions. The name derives from the fact that the n-bit number may be converted to a value in the range 0.0 . . . 1.0 by creating a number with infinite repetitions of the n-bit value to the right of a binary point.

Each field of a voxel may be, for example, a multiple of four bits and aligned within the voxel at four-bit boundaries. Externally, voxel fields may be either unsigned binary integers, unsigned rational numbers in the range 0 . . . 1.0 inclusive, i.e., repeating fractions, or signed rational numbers in the range [−1.0 . . . 1.0], i.e., a sign bit plus a repeating fraction magnitude in the range [0.0 . . . 1.0]. Internally, each voxel field is scaled and converted to an unsigned number in the range [0.0 . . . 1.0].

The results of rendering a volume are typically one or more images. Our rendering engine produces the images in real-time under dynamically varying viewing conditions. Each image is represented as an array of pixels. A pixel is a data structure denoting a small patch of grey-scale or color centered at an associated point in a two-dimensional image plane. Three components of each pixel (RGB) denote the amount of each of the primary colors, red, green, and blue, that are contributed to the image at that pixel. A fourth component, alpha ($\alpha$), denotes the degree of opacity or transparancy of that patch of color.

Associated with some, but not all, two dimensional image arrays are two dimensional depth arrays. When present, a depth array has one element for each pixel in the image array located at corresponding coordinates in the depth array. Each value in the depth array denotes a distance from some reference plane. The depth array is typically used to denote the position, in three dimensional space, of a small part of the image represented by its corresponding pixel. Depth arrays can be used to represent arbitrary clipping surfaces and to position embedded objects at their correct locations with the volume.

Rays

Rendering is performed by casting rays through the volume data set. An imaginary ray is passed through each pixel of the image plane or through a designated point on some other plane. Color and opacity values at sample points along each ray are accumulated, and the accumulated value is stored into the pixel associated with that ray. The invention uses sample points that are arranged in planes parallel to a selected base plane of the volume.

In order to accumulate color and opacity along a ray, five basic operations are performed: gradient estimation, interpolation, classification, illumination, and compositing. These are now described in further detail.

Gradients

Gradients are estimated at, or associated with voxels before any other processing takes place. A gradient is a vector denoting the spatial rate of change of some field of the voxel or of some property of the object. That is, a gradient is the number of units of change in the field value or property for a unit step in each of the three dimensions. The fields upon which gradients are based may be user specified.

Central Differences

As shown in FIG. 1a, we estimate gradients by taking central differences. That is, the three components of the gradient vector at a voxel $V_i$ are estimated by subtracting the corresponding fields of each of the neighboring voxels in the three dimensions. A gradient $G_1$ 101 is estimated at voxel point $V_1$ 102 by subtracting a field of a voxel to the right from the same field of a voxel to the left for the gradient component in the horizontal direction, and by subtracting a field of a voxel below from the same field of the voxel above for the gradient component in the vertical direction. The gradient component in the third dimension is similarly obtained by subtracting a field of a voxel in front from.that of a voxel behind. Note that it is not necessary to use the same voxel field for all three gradient components.

A curved line 103 represents a "surface" or boundary between two different types of material represented by the volume data set, e.g., the interface between bone and muscle, or perhaps the surface between skin and air. Because voxel $V_1$ happens to be located on this boundary, the magnitude of the gradient is large, and the gradient itself approximates a normal vector to this surface or boundary. By contrast, the material in the volume at voxels $V_2$ 104 and $V_3$ 105 is relatively homogeneous, so the gradients at those voxels have very small magnitudes and point in random directions. Of course, it is also desirable to know gradients at other points along the surface, not just at voxels, for example, gradient $G_4$ 106 at sample point $S_4$ 107.

Gradient Correction

Figure 1B:
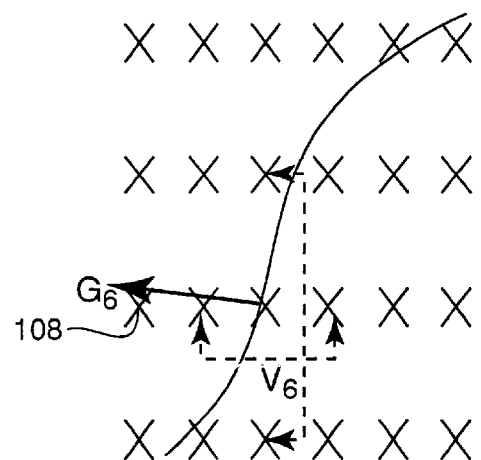

As shown in FIG. 1b, the gradient estimation function produces a distorted gradient for anisotropic or gantry-tilted volumes. In this case, the spacing of the voxels in one direction (verical) is larger than the spacing in another direction (horizontal). Therefore, the central difference in the vertical direction takes the differences between fields of voxels that are farther apart in the real world than does the central difference in the horizontal direction.

This has the effect of minimizing the vertical component of the gradient relative to the horizontal component, thereby producing a vector $G_6$ 108 which is not really normal to the surface or boundary. It is easy to see that this is a systematic problem for data sets that do not have axes at right angles to each other or data sets that have voxel spacing that varies from one dimension to another.

To address this problem, we provide a gradient correction matrix. The matrix can be: applied to every gradient after the gradients are estimated. The application of the matrix results in a linear transformation that reverses the effects of the anisotropy and shear, so that the transformed gradient is more normal to the surface at its point of estimation.

Coordinate Systems

Figure 2:
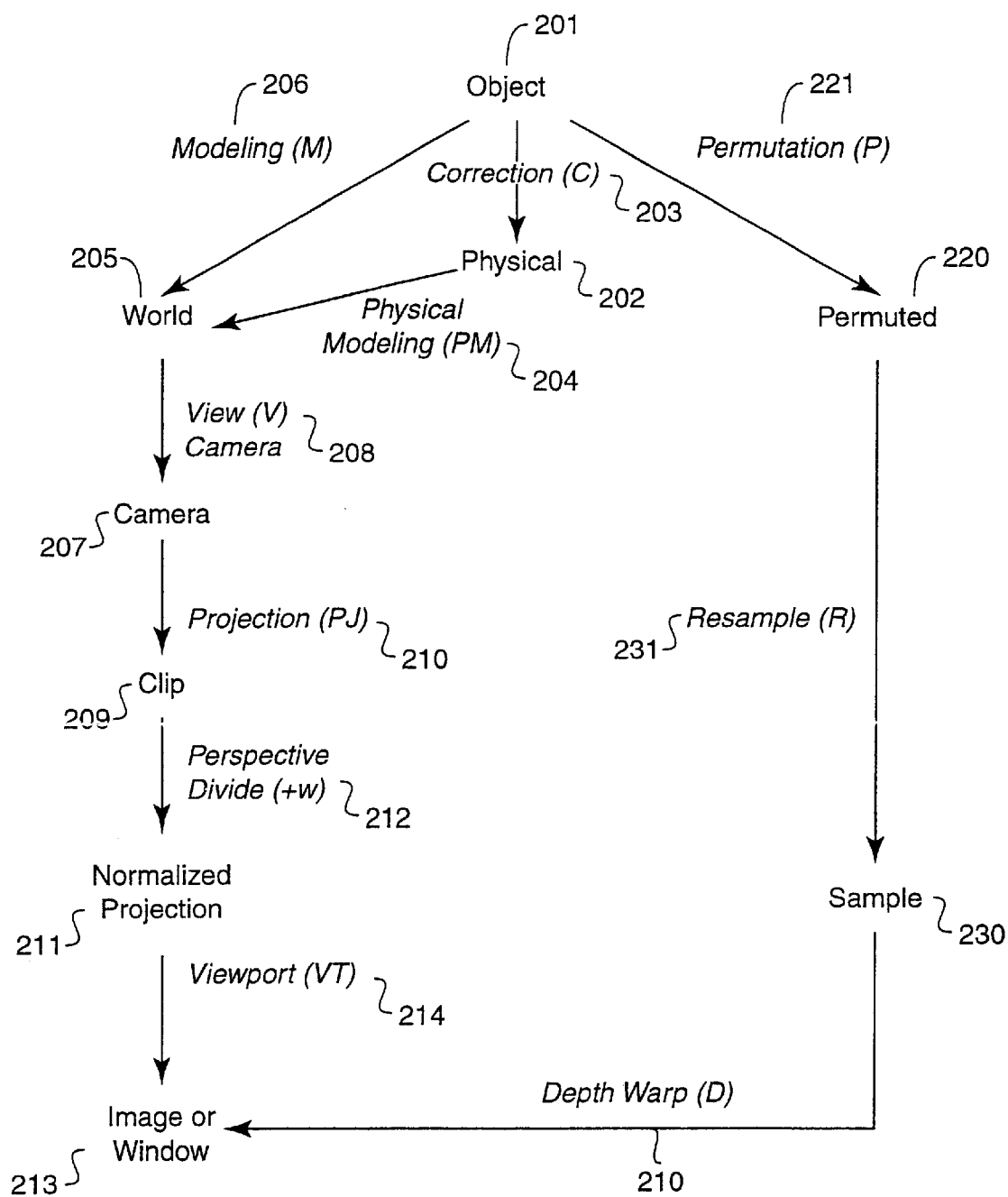
FIG. 2 is a graph of coordinate systems and transformations used between the coordinates system according to the invention.

As shown in FIG. 2, our system works with a number of coordinate systems and transformations, some of which are related to those used in traditional 3D polygon graphics and some of which are specific to volume rendering according to the invention. The coordinate systems define "spaces." Hereinafter, we use the term space and coordinate system interchangeably. In FIG. 2, the coordinate systems on the left are familiar in the art of computer graphics, whereas the coordinate systems on the right are according to the present invention. It should be noted that for both systems, the starting coordinate system (object) and ending coordinate system (image) are, of course, the same.

Object Coordinates

The object coordinates system 201 is the native, internal coordinate system of the object (volume) being rendered. In 3D polygon graphics, this is a set of coordinates in which the surfaces of the object are described relative to an internal origin and a canonical point of view. However, in volume graphics, object coordinates are the array indices associated with the three dimensional array of voxels.

More precisely, in our system, the object coordinate system of a volume object is a three-dimensional, rectilinear system with voxel located at the non-negative integer coordinates. An isotropic volume data set is represented in object space as a three dimensional array of voxel values. The origin of the object coordinate system is the center of the voxel represented by array coordinates (0, 0, 0). A voxel value at array coordinates (u, v, w), where u, v, and w are non-negative integers, represents one or more properties of the object in a region of space centered at or near that voxel in object space. For example in a CT scan of an object, a voxel represents the integral of the density of the material of the object over a gaussian volume centered at the voxel.

Throughout this description, we use coordinates uvw and UVW when referring to object coordinates 201.

Physical Coordinates

Object space itself is a rectilinear coordinate system. That is, its axes are implicitly at right angles to each other, and the spacing of voxels is exactly one unit of distance in any dimension. This does not necessarily correspond to the real world in which the object itself is located. In particular, voxels representing the object may not be arranged according to axes at right angles (gantry-tilted volumes) to each other, and the spacing of voxels may not be the same in each of the three dimensions, as stated above for anisotropic volumes.

Physical Coordinates

Therefore, we introduce a second, related coordinate system called physical coordinates 202. This is a Cartesian, i.e., rectilinear coordinate system where voxels are located at their actual positions in the real or physical world of the object, relative to the internal origin of the object, or to some other designated point in the object. In particular, voxels are not necessarily located at integer coordinates in physical space, even though they are located at integer coordinates in object space. Although not strictly necessary, it is convenient for one of the axes of physical space to be the same as a corresponding axis of object space, while the other two axes are sheared and/or scaled with respect to those of the object coordinates 201.

For example, in a CT scan of the human body, the longitudinal axis of the body, from head to foot, is fixed and the spacing of slices is defined by the operator of the scanner. The angles of the other two axes depend on the tilt of the gantry of the CT scanner, and the spacing of voxels along those two axes depend upon electronic settings in the X-ray transducers of the scanner.

Therefore, while voxels are located at integer positions when using object coordinates, they are placed in the physical coordinate system at their actual non-integer positions in three-dimensional Cartesian coordinates of the real world relative to the longitudinal axis of the body.

Figure 3:
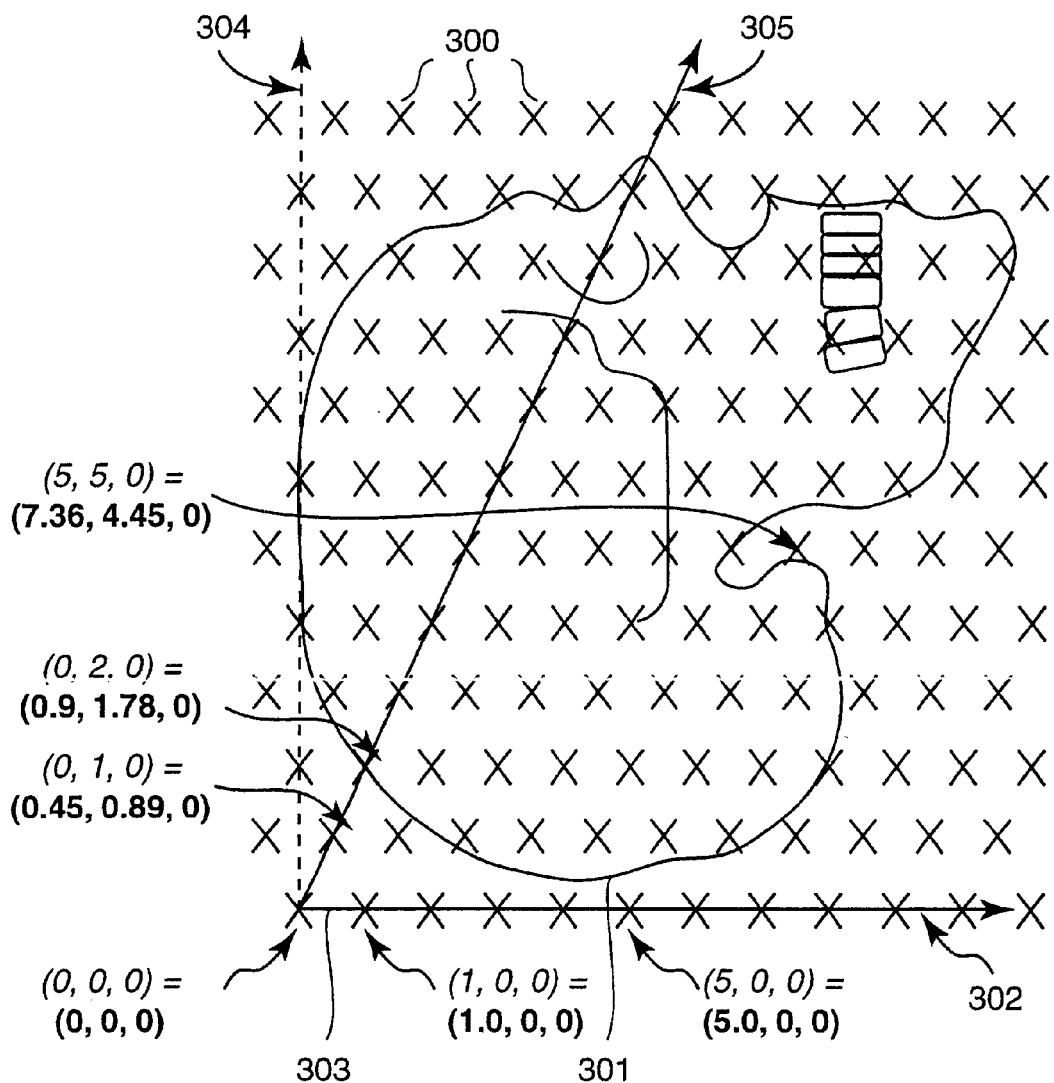
FIG. 3 is a graph of a cross-section of voxels.

FIG. 3 shows a cross-section of the voxels 300 of a head 301 of a person lying on the table of a CT scanner. The solid axes are the axes of object space, and the coordinates in italics indicate the voxel positions in the object coordinate system. The longitudinal axis 303 of physical space is superimposed on the longitudinal axis of object space and therefore is not separately visible. The "vertical" axis 304 of physical space is the vertical axis of the room and is shown as a dotted arrow at right angles to the longitudinal axis. The axis of the gantry 305 of the scanner is represented by the diagonal arrow. The coordinates in bold indicate the positions of voxels in physical space.

A correction transformation (C) 203 in FIG. 2 is a linear transformation from object to physical space, i.e., for converting the integer coordinates of object space 201 to non-integer coordinates reflecting the positions of voxels in the object in the real world relative to its internal origin. The transformation C 203 is a property of the object and the way the object was sampled to generate the volume data set. It is not dependent upon the relationship between the object and the surrounding environment or scene.

There are two reasons for introducing the physical coordinate system. First, it allows a scene graph manager to position the object in a scene without having to become specifically aware of the internal nature of the sampling regime by which the volume object is produced. For example, if it is desired to rotate the object in world space, then one approach would be to construct C to represent the gantry-tilt and anisotropy and to relocate the origin of the object to the center of the axis of rotation. Then, successive physical modeling matrices (PM) 204 can be defined to denote the rotation of the physical object, regardless of its internal representation.

The second reason for introducing the physical coordinates 202 is to provide an environment for illumination. If object space 201 is not the same as physical space 202, then gradients estimated from voxels in object space would not be perpendicular to their surfaces in the real-world. Therefore, the correction transformation 203 is used to correct gradients for use in lighting calculations.

A world space 205 is a coordinate system in which all objects of a scene are embedded. Each object has a modeling transformation (M) 206 which converts its particular object coordinates to world coordinates. This transformation rotates, scales, and translates the object to its position in some "world" relative to other objects. Modeling transformations are well known in the art of computer graphics.

In the case of volume objects, particularly objects sampled to anisotropic or gantry-tilted grids, the modeling transformation M 206 can be regarded as a concatenation of the correction transformation C 203 and the physical modeling transformation PM 204, i.e., M=PM×C. The physical modeling transformation positions, scales, and rotates the object in world space without reference to its anisotropic or gantry-titled sampling characteristics.

That is, the correction C is determined by the volume object itself and by the sampling process used to obtain the voxels. The correction is independent of the relationship of the object to any other object in the scene or to how those objects are viewed. The transformation PM 204 is determined by the position and orientation of the object in the world or the scene with respect to other objects. The transformation PM is independent of how the volume object was sampled and of the spacing and alignment of its voxels.

Camera coordinates 207 represent the scene as observed by the viewer. The camera coordinates 207 are obtained by a view transformation (V) 208, such as might be constructed by a camera functions "gluLookAt" of the OpenGL™ rendering system. The view transformation 208 changes as the camera moves with respect to the world, e.g., while "orbiting" the scene, but the view transformation does not change when the object within the world rotates, i.e., changes its M transformation 206.

Clip Coordinates

The clip coordinates 209 reduce the view of the world, as seen by the camera, from an infinite coordinate system to a finite coordinate system bounded by a view frustum or view parallelepiped. The projection transformation (PJ) 210 maps the camera coordinates 207 to the clip coordinates 209.

Normalized projection coordinates 211 are a normalization of the scene as viewed from the camera to a set of standard coordinates in the range [−1.0, . . . , +1.0] in each of the x-, y-, and z-directions. In the case of perspective projection, objects appear foreshortened and parallel lines appear to converge in the distance. Normalized coordinates 211 are obtained from the clip coordinates 209 by applying a perspective divide 212 by w, the scaling factor in homogeneous coordinates. For an orthogonal projection, w=1.

Image Coordinates

Image coordinates 213 are the coordinates of the screen, window, or output device, i.e., the image plane. In many instances, this is a two-dimensional coordinate system of the image where the object or scene is displayed. Most 3D polygon graphics systems have a two-and-a-half dimensional coordinate system in which the axis perpendicular to the plane of the image is represented as a set of depth values. We use a true three-dimensional image coordinate system for the image.plane.

For purposes of this specification, we define the image coordinates to be a three-dimensional coordinate system in which one unit in the x- and y-dimensions corresponds to exactly one pixel of spacing in the image plane and in which one unit in the z-dimension is the smallest increment of a depth value. These are the coordinates used to render embedded polygon objects, and the coordinates used to check for visibility and occlusion of one object by another.

A viewport transformation (VT) 214 maps the normalized projection coordinates 211 to image coordinates 213. We denote the axes of the image coordinates by $x_i y_i D$ or $X_i Y_i D$.

In our xy-image order rendering engine, as described below, rays pass perpendicularly through the centers of the pixels, which are at integer positions in image coordinates. The image plane is an arbitrary plane of image coordinates with constant depth that is at least as close to the view as a "near plane" of the view frustum or view parallelepiped of clip space 209.

Permuted Coordinates

Permuted coordinate 220 are a transform of the object coordinates 201 of a volume object. The transform is described in greater detail below. This transform rearranges the labels and possibly the directions of the axes of object coordinates so that the z-axis of object space is substantially parallel to the rays, i.e., the view direction. In one embodiment, this orientation can be achieved by selecting a surface of the volume most nearly parallel to the image plane as the base plane. Thus, the rays traverse the volume data set in a non-negative direction in each of the x-, y-, and z-dimensions. In this description, we use the notation $x_v y_v z_v$ and $X_v Y_v Z_v$ to denote permuted voxel coordinates 220. The origins, i.e., the (0, 0, 0) points, of the permuted coordinates 220, and the object coordinates 201 are substantially near each other but are not necessarily at the same point.

The voxels are organized in a rendering memory 1360, see below with reference to FIG. 13, as mini-blocks 1401, see FIG. 14. A miniblock is a 2×2×2 array of voxels. Each data access to the volume data set in memory retrieves a mini-block at an address of interest. If the view direction is such that the rendering engine scans the volume in a negative direction along one or more of its axes, then the starting point is offset by one voxel in that dimension in order to start at a mini-block boundary. This is achieved by subtracting a bias value of one in that dimension when transforming from the object coordinates 201 to the permuted coordinates 220 using a permutation transform P 221.

Object to Permuted Coordinates

Figure 4:
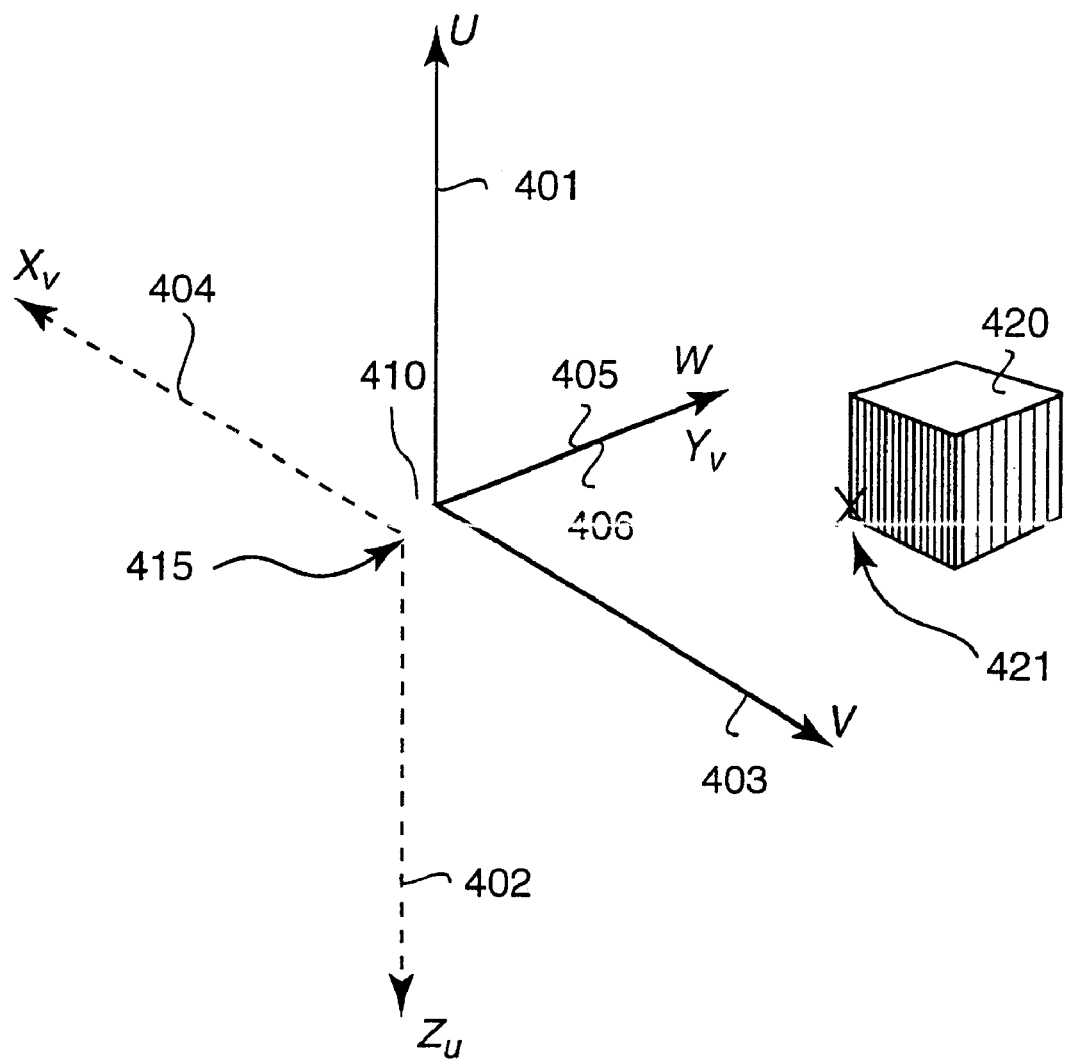
FIG. 4 shows an object with permuted axes.

FIG. 4 shows an example of the permutation of the object coordinates to the permuted coordinates. Axis u 401 of the object coordinates has been permuted to the negative z-axis 402 of the permuted coordinates, axis v 403 of object coordinates has been permuted to the negative x-axis 404, and axis w 405 has been permuted to the positive y-axis 406. An origin 410 of the object coordinates $(0_u, 0_v, 0_w)$ is located at a point $(-1_x, 0_y, -1_z)$ 415 in the permuted coordinates.

A box 420 is positioned so that a voxel X 421 at one of its corners is located at coordinates (2, 4, 1) in uvw-coordinates, i.e., the object coordinates, has coordinates (−5, 1, −3) in $x_v y_v z_v$-coordinates, i.e., permuted coordinates.

The permuted coordinates 220 are a convenient way to read voxels and process samples in order. Most of the internal processes of our rending pipeline are expressed in permuted voxel coordinates rather than in object coordinates. The derivation of the permuted coordinates for particular object and modeling and view transformations is described below.

Although voxels are located at integer coordinates in object space, we occasionally refer to non-integer coordinates in permuted space. Our rendering engine is capable of resolving permuted coordinates to 1/256 of voxel spacing, which we call a subvoxel, and uses an additional 9 bits of precision in the incremental calculations that produce sub-voxel positions. In this description, we occasionally use the term permuted subvoxel coordinates to mean permuted coordinates scaled by a factor of 1/256, that is, with eight bits of fractional precision. However, permuted coordinates are not necessary to work our invention. In an alternative embodiment the volume is rendered directly from object coordinates to sample coordinates.

Sample Coordinates

Sample space is a coordinate system where all rays are most nearly parallel to the z-axis of the permuted coordinates and where all sample points are spaced one unit apart at non-negative integer coordinates in each of the x-, y- and z-dimensions. The set of sample points of a particular ray is the set of points in sample coordinates with constant x- and y-coordinates but varying z-coordinates. We use the notation $x_s y_s z_s$ and $X_s Y_s Z_s$ to denote points in sample coordinates. We apply a resampling transformation R 231 to convert the permuted coordinates to sample coordinates. That transformation is described in greater detail below.

XY-Image Order

How we define sample space in a particular situation depends upon what we want to do with it. Our primary method of volume rendering is to cast rays through the centers of pixels of the image plane while organizing the sample points along the rays into slices (planes) parallel to the $z_v$-axis (base plane) of the permuted coordinates of the volume. We call this xy-image order.

In an alternative method, we use a variation of the shear-warp process. There, rays are cast through an aligned rectangular grid of pixel points in a "base plane," i.e., a plane that is coplanar with the $x_v y_v$-face of the volume most nearly parallel to the image plane. We call this object order rendering.

For the xy-image order rendering, we define the x- and y-axes of sample coordinates to be substantially identical as those of image coordinates 213, that is there is one ray for each pixel. The xy-image order is described in greater detail below.

However, the $z_s$-axis is different from the depth-axis (D-axes) of the image coordinates 213. In particular, the D-coordinate, i.e., depth, of a sample point is a measure of its distance from the image plane. In sample space, by contrast, planes of constant z-values are parallel to the $x_v y_v$-plane of permuted space and therefore are not necessarily parallel to the image plane. Therefore, we perform a depthwarp transformation (D) 240 to go from sample space to image space.

The reason for this unconventional definition of the sample coordinates 230 is because we render a volume by accessing slices of voxels at a time in an efficient, orderly manner, whether it is rendering in xy-image order or in object order. From these voxel slices, we resample to obtain sample slices that are inherently parallel to the voxel slices. That is, all samples of the same sample slice have the same $z_v$-coordinate with the permuted voxel coordinates 220. This has the advantage that our definition combines the image quality associated with prior art image order rendering, obtained by doing one interpolation instead of two, with the performance associated with prior art object order rendering, obtained by using the parallel voxel and sample planes to reduce the number of multiplies required to perform the interpolation.

Figure 5:
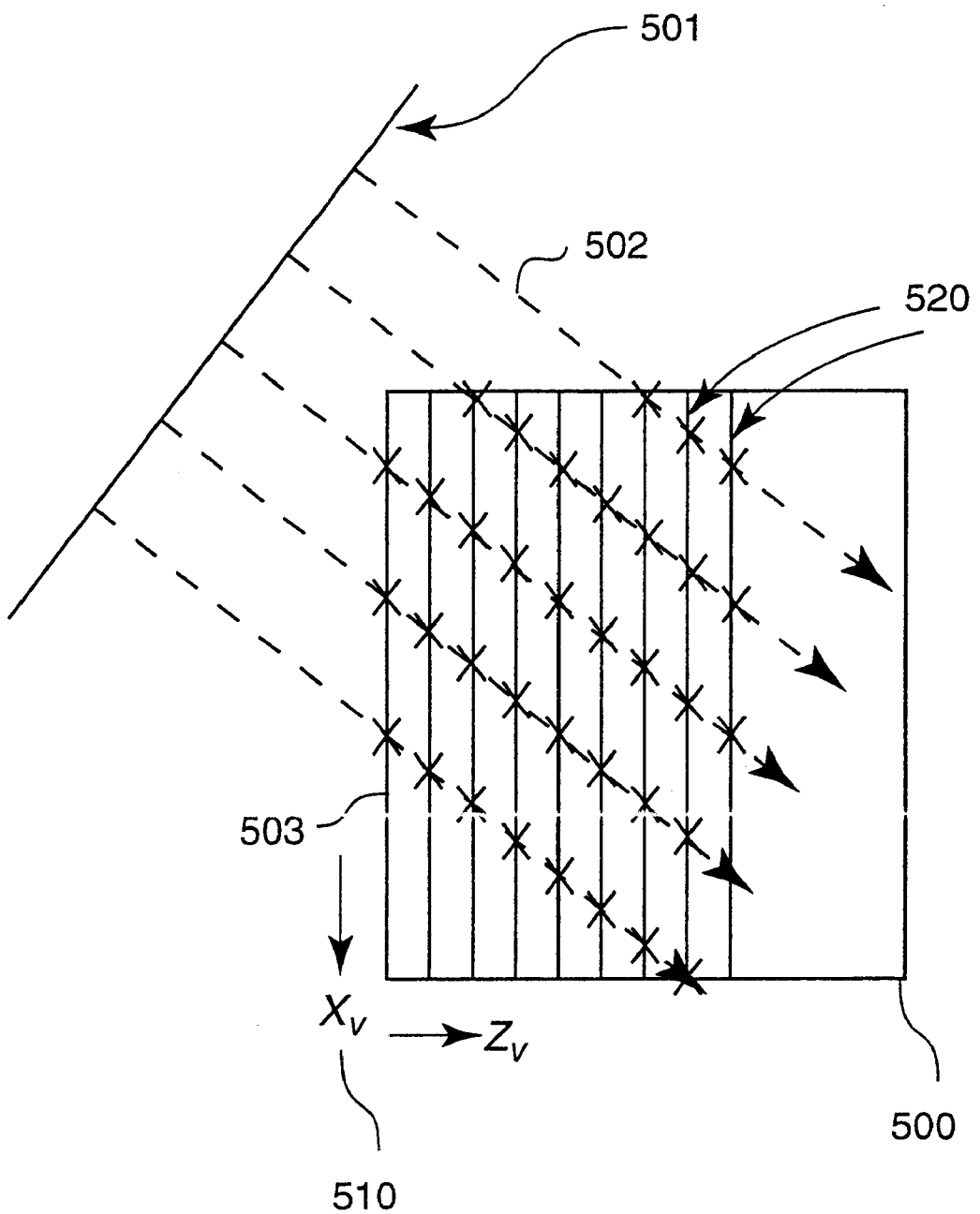
FIG. 5 shows rays cast through a volume data set.

FIG. 5 shows a volume data set with ray casting and voxel sampling according to the invention. In FIG. 5, a cross-section of a volume 500 is shown in permuted space. An image plane 501 is located at the upper left of the figure, somewhere outside the volume and at some arbitrary angle. Rays 502 are cast from each pixel of the image plane through the volume 500. For orthographic projection, the rays are perpendicular to the image plane.

The $x_v$- and $z_v$-axis 510 of the volume are shown in this figure, and the $y_v$-axis is perpendicular to the page. The x- and y-axes of the image plane are not, in general, parallel or perpendicular to the page, so that the rectangular array of pixels on the image plane may rotated about an axis parallel to the rays. A surface 503 is selected as a base plane. In one embodiment, the selected surface is most nearly parallel to the image plane 501.

Sample points 520 (x on each ray 502) lie on planes parallel to the base plane 503 ($x_v$ and $y_v$ axes). Each sample point also lies on a ray, so a slice of sample points comprises the points at which the rays intersect a particular plane of constant $z_v$-value with the permuted coordinates. Note that the $z_v$-coordinate of a slice of sample points is not necessarily, or even typically, an integer in permuted coordinates. By definition, however, the corresponding $z_s$-coordinate in sample space is an integer.

Origin of Sample Coordinates

In the following sections, we define the origin of our sample coordinates 230 to coincide with a point (0, 0, depth0) in the image coordinates 213. In this definition, depth0 is a depth value assigned to accommodate the needs of rendering embedded polygon objects. Whether depth values increase or decrease in the direction toward the image plane is a function of external factors such as the representation of depths in a 3D polygon graphics system.

We use the origin of the sample coordinates as the starting point for traversing a volume during rendering, and the traversing needs to know the location of this origin relative to its voxel with the permuted coordinates 220.

Figure 6:
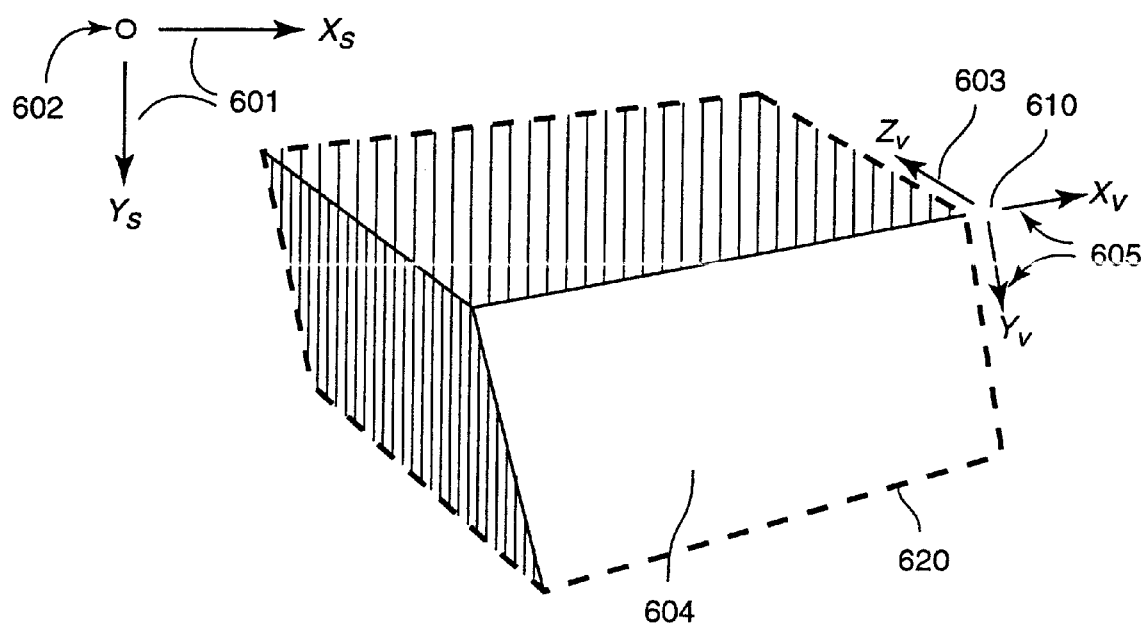
FIG. 6 shows a volume from the point of view of an image plane.

FIG. 6 shows a volume 600 from the point of view the image plane. The volume is a rectangular parallelepiped that is scaled, rotated, and translated by arbitrary amounts. In this view, the $x_s$- and $y_s$-axes 601 are in the plane of the page, and the $z_s$-axis, parallel to the view direction, is perpendicular to and pointing toward the page.

In this particular example, the origin 610 of the permuted voxel coordinate system 220 happens to be near the upper right front corner of the volume. By the definition of our permuted coordinates, the $z_v$-axis 603 is most nearly parallel to and in the direction of viewing rays. In this example, the $z_v$-axis happens to be the axis perpendicular to the large, lightly-shaded face 604 of the volume. The other two axes 605 of permuted coordinates were chosen to form a right-handed coordinate system in which rays point in the non-negative directions.

In this case, it can be seen that the origin 602 of the sample coordinates 230 is located well outside of the volume and in the negative direction in all three dimensions relative to its origin of permuted coordinates. It can also be seen that the outline of the volume itself forms an irregular hexagon when projected onto the $z_s=0$ plane with the sample coordinates; this is illustrated by the heavy dashed line 620.

View Frustum

Of particular interest for rendering a volume is the view frustum or view parallelepiped. This is a subset or range of sample coordinates in all three dimensions, in effect, a clip region that is orthogonal in sample space. A view frustum may completely contain the volume, may be completely contained within a volume, or may intersect a volume.

Figure 7A:
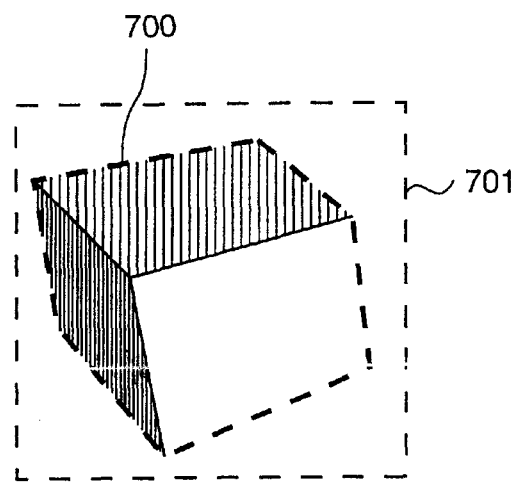
FIGS. 7a–c is a block diagram of three examples view frusta.
Figure 7B:
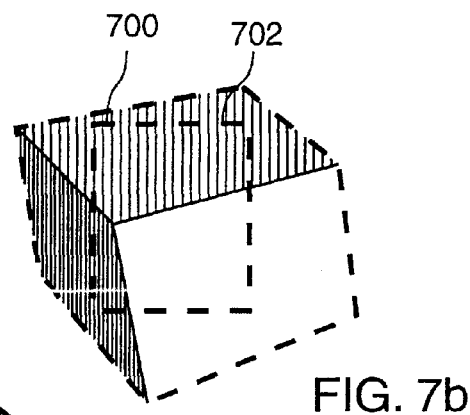
Figure 7C:
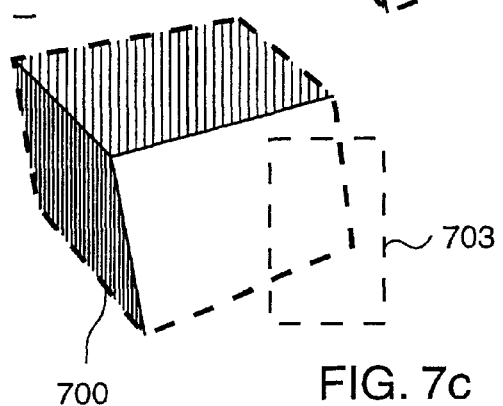

FIGS. 7a–c show several examples of view frusta. FIG. 7a shows a view frustum 701 large enough to enclose an image of an entire volume 700. FIG. 7b shows a view frustum 702 smaller than the image of the volume 700, so that the viewer can focus on a specific area of interest. FIG. 7c shows a view frustum 703 at the edge of the volume extending into the surrounding space. This view would be for an application that had other objects to display adjacent to or embedded in the volume.

The view frustum is specified by minimum and maximum bounds of coordinates in sample space 230. That is, the minimum and maximum of $x_s$, the minimum and maximum of $y_s$, and the minimum and maximum of $z_s$. This corresponds to the range resulting from the viewport transformation 214.

We do not consider any ray or process any sample point that is outside the view frustum. When embedding images of other objects, we only read pixel and depth values of those objects that lie within the view frustum. When writing out updated depth values, or when writing pixel values of the rendered volume, we only write to elements of the pixel and depth array that lie within the view frustum.

Transformations of Sample Coordinates

FIG. 2 shows two transformations pertaining to sample coordinates. The first is the resampling transformation (R) 231, which maps the permuted voxel coordinates to -the sample coordinates. This transforms each point ($x_v$, $y_v$, $z_v$)

with the permuted coordinates 220 to the coordinates ($x_s$, $y_s$, $z_s$) of the coinciding point in sample space 230.

In general, the transformation R has an inverse $R^{-1}$ which maps points of sample space ($x_s$, $y_s$, $z_s$) to their coinciding positions ($x_v$, $y_v$, $z_v$,) in permuted space. Our hardware rendering engine is, in fact, an efficient implementation of the $R^{-1}$ transformation.

We step through sample space in $x_s y_s z_s$-order, and for each sample point, obtain its $x_v y_v z_v$-coordinates by incrementally applying the inverse resampling transformation $R^{-1}$. The rendering parameters are taken from the matrix representation of $R^{-1}$. Thus, in general, we step through sample space and incrementally map sample points to object space.

The other transformation related to sample space is the depthwarp transformation D 240. This transformation maps the coordinates of sample space 230 to the coordinates of image space 213. The depthwarp transformation serves two purposes.

First, when we render a volume in xy-image order, see below, the depthwarp transformation converts $z_s$-coordinates of sample space 230 to depth values of image space 213. The depthwarp transformation 240 leaves the $x_s$- and $y_s$-coordinates unchanged.

Second, when rendering the volume according to the shear-warp process, the depthwarp transformation can also perform the warp step of the process, in addition to mapping $z_v$-coordinates to depth values.

Deriving Rendering Parameters

To derive the rendering parameters for a shear-warp process, it is sufficient to project a unit vector in the z-dimension in camera coordinates 207 through the inverses of the view and modeling transformations to find an equivalent representation in object coordinates 201. This is used to derive the slopes of rays and other rendering parameters. There is no specific assignment of the origin, and the spacing between rays and between samples along rays was determined empirically.

In this section, we derive the rendering parameters and transformations so that we can render in xy-image order, i.e., so that rays pass exactly through the centers of the pixels in the image plane.

As an advantage of xy-image order rendering, the resulting two-dimensional image can be copied directly to a display or output device, without the need for a warp or other post-processing step as in the prior art.

Using these transformations, software can precisely control the positions of objects in the scene, independent of view direction and/or orientation of those objects. Later, we will use this analysis to derive precise settings for rendering with the shear-warp process.

Overview of Rendering in XY-Image Order

We start by knowing all of the graphics transformations on-the left of FIG. 2, from the graphics context into which the volume object is to be rendered. This includes the modeling transformation M 206, the view transformation V 208, the projection transformation PJ 210, the perspective divide 212, and the viewport transformation VT 214. For convenience in notation below, we collapse the transformations PJ, the perspective divide, and VT into a single transformation VP. We assume that M, V, and VP all have inverses, e.g., $VP^1$.

We are also given the specification of the viewport in which the volume object is to be displayed, including its width, height, and the depth values depthNear and depthFar of its front and back faces, respectively. Depth values should be the same as used by companion polygon graphics system such as OpenGL™ for rendering embedded polygon objects.

Lastly, we also have the number of sample points points along each ray in the Viewport.

Figure 8:
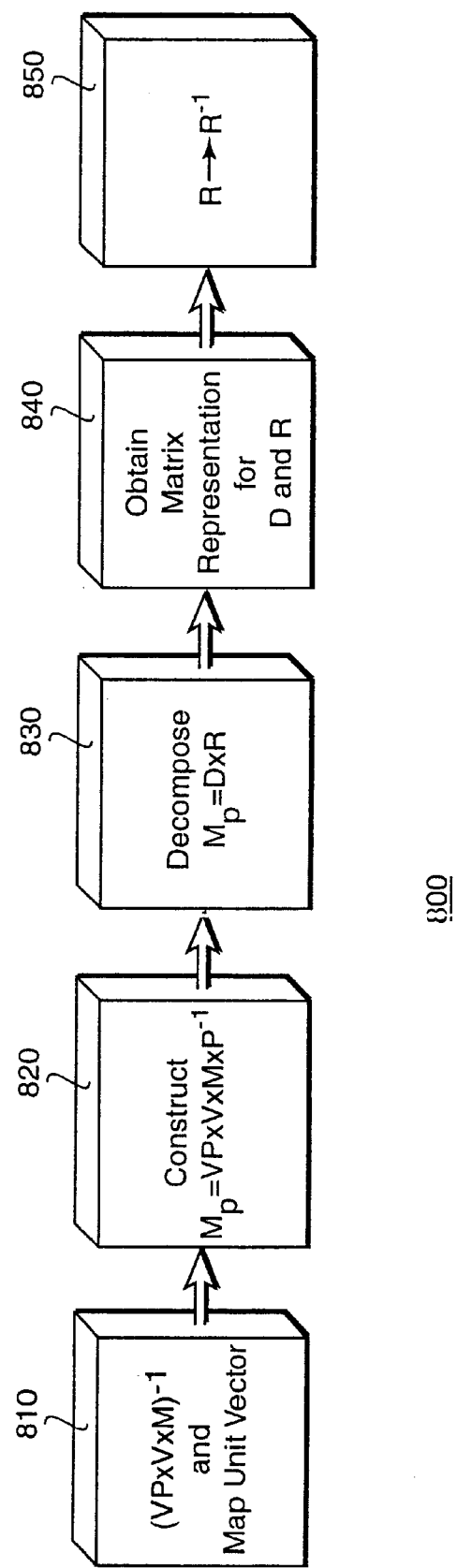
FIG. 8 is a block diagram of a method used by the rendering engine of the invention.

As shown in FIG. 8, we perform the following steps to render a volume in xy-image order.

In step 810, the product VP×V×M is inverted, and the result is used to map a unit vector in the image plane to its representation in object space. From this representation, construct the permutation transformation P and its inverse $P^{-1}$.

In step 820, an intermediate matrix $M_p$=VP×V×M×$P^{-1}$ is constructed. This matrix represents the transformation of any point in permuted coordinates into the same point in image coordinates.

In step 830, the matrix $M_p$ is decomposed into the product $M_p$=D×R, i.e., the product of the resampling and depthwarp transformations. There will be two unknown entries in the matrix representations of each of D and R.

Using the initial assumptions, step 840 solves for these unknown values to obtain complete matrix representations of D and R.

In step 850, R is inverted to obtain $R^{-1}$, the matrix representation of a transformation that maps points of sample space to coordinates in permuted space. The matrix entries of D and $R^{-1}$ are used to set incremental (step size) values of registers in the rendering pipeline.

In the preferred embodiment, the above steps are performed by graphics driver software in a host computer in repsonse to a user selecting a particular viewing mode. The matrix entries are then written to registers that control the operation of the rendering pipelines. The register values essentially are incremental (delta) values that control step sizes for the sample points.

Permutation Transformation

To obtain the permutation transformation P, we transform a unit view vector from image coordinates to object coordinates. The unit view vector in image coordinates is a vector that points along the z-axis from the image plane to the volume object and is one unit of depth in length, either $$\begin{bmatrix} 0 \\ 0 \\ 1 \\ 0 \end{bmatrix} \text{ or } \begin{bmatrix} 0 \\ 0 \\ -1 \\ 0 \end{bmatrix}$$

depending on the orientation of the depth axis of image space.

Assuming that depth increases away from the image plane, we find the representation of the view vector in object space by applying the inverses of the VP, V, and M transformations to obtain a vector $[du, dv, dw, 1]^T$, where $^T$ is the transform operator, as follows:

$$\begin{bmatrix} du \\ dv \\ dw \\ 0 \end{bmatrix} = M^{-1} \times V^{-1} \times VP^{-1} \times \begin{bmatrix} 0 \\ 0 \\ 1 \\ 0 \end{bmatrix}.$$

From this vector, it is possible to derive the mapping of axes of object coordinates to the axes of permuted coordinates so that rays are most nearly parallel to the z-axis and so that they traverse the volume in the non-negative x-, y-, and z-directions.

The selection of the z-axis is straightforward. It is the axis corresponding to the largest of the absolute values of the components |du|, |dv|, and |dw|. That is, if |du| is the largest, then the view direction is most nearly parallel to the u-axis, and therefore this axis is mapped to the z-axis in permuted coordinates. Likewise, if |dv| is the largest, then the v-axis is mapped to the z-axis in permuted coordinates, and if |dw| is the largest, then the w-axis is mapped to the z-axis in permuted coordinates. If two components have equal absolute values larger than the third, then either can be selected; if |du|=|dv|=|dw|, then any axis may be selected.

Figure 9:
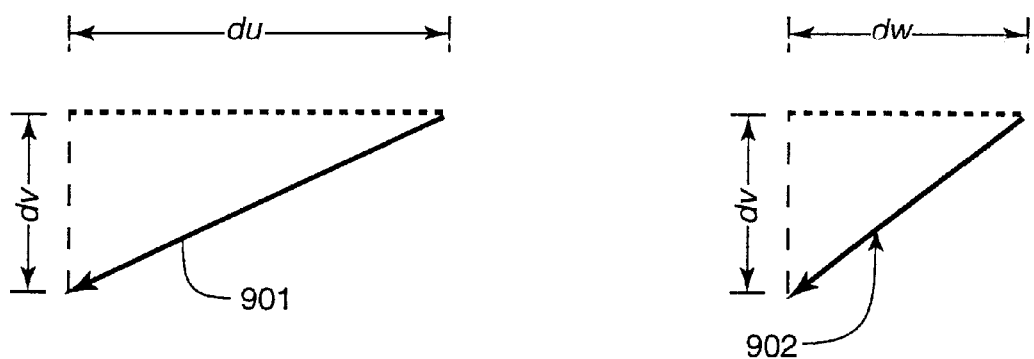
FIG. 9 shows a projection of unit vectors into object space.

This is shown in FIG. 9. The transformation of the unit view vector from image coordinates 213 is projected onto the uv- and vw-planes in object coordinates 201. Vector 901 is the projection of the unit vector onto the uv-plane and vector 902 is the projection of the unit vector onto the vw plane. It is evident from FIG. 9 that the view vector is most nearly parallel to the u-axis. That is, the angle between the view vector and the u-axis is smaller than the angles between is and the v- and w-axes. This is equivalent to saying that |du|, the magnitude of the u-component, is larger than either |dv| or |dw|.

Table 1 indicates the assignment of axes in a right-handed system where max(|du|, |dv|, |dw|)=|du|.

TABLE 1

| sign(du, dv, dw) | Principal view axis | +x-axis | +y-axis | +z-axis |
|---|---|---|---|---|
| du ≧ 0, dv ≧ 0, dw ≧ 0 | +u | +v | +w | +u |
| du ≧ 0, dv ≧ 0, dw < 0 |  | −w | +v | +u |
| du ≧ 0, dv < 0, dw ≧ 0 |  | +w | −v | +u |
| du ≧ 0, dv < 0, dw < 0 |  | −v | −w | +u |
| du < 0, dv ≧ 0, dw ≧ 0 | −u | +w | +v | −u |
| du < 0, dv ≧ 0, dw < 0 |  | +v | −w | −u |
| du < 0, dv < 0, dw ≧ 0 |  | −v | +w | −u |
| du < 0, dv < 0, dw < 0 |  | −w | −v | −u |

After the z-axis is identified, its direction and the assignment of the other two axes are derived from the signs of du, dv, and dw. In particular, rays must point in the non-negative directions in the x-, y-, and z-dimensions in permuted coordinates, and we adopt the convention of a right-handed coordinate system. There are twenty-four possible right-handed coordinate systems, eight for each mapping of the z-axis, and another twenty-four possible left-handed systems.

Table 1 shows the mappings to right-handed systems in which |du| is at least a great as either of |dv| or |dw|. It should be apparent how to construct the equivalent of Table 1 for the case where |dv| is larger than |du| and at least as large as |dw|, for the case where |dw| is larger than either |du| or |dv|, and for the left-handed systems.

From Table 1, we can construct the eight permutation matrices P corresponding to these eight cases, in which the unit view vector is most nearly parallel to the u-axis. These are shown in FIG. 10. Note that for each permutation in which an axis is mapped to, the negative of another axis, the origin is translated by −1 in that dimension. Therefore, there are some non-zero values in the fourth columns of some of the P matrices. From the 5 permutation matrix P, it is possible to obtain its invers $P^{-1}$.

The Intermediate Transformation $M_p$

In step 820 of FIG. 8, we constructed an intermediate transformation called $M_p$ as follows:

$$M_p = VP \times V \times M \times P^{-1}. \quad [1]$$

Because VP, V, and M are known in matrix form from the graphics context, and because $P^{-1}$ can be derived from the permutation transformation construction above, $M_p$ can be determined by a matrix multiplication.

By inspection of FIG. 2, it can be seen that MP transfors permuted coordinates into image coordinates. It also translates the origin of permuted coordinates to a point in image space.

Any linear transformation from one 3D space to another 3D space can be expressed as a matrix in homogeneous coordinates made up of four column vectors. The first three columns define how a unit vector in each of the three dimensions of the source space are transformed, respectively, into vectors in the target space. The fourth column defines how the origin of the source space is transformed to an origin in the target space. $M_p$ is such a linear transformation, and therefore it is written as:

$$M_p = \begin{bmatrix} dx_i x_v & dx_i y_v & dx_i z_v & X0_i \\ dy_i x_v & dy_i y_v & dy_i z_v & Y0_i \\ dDx_v & dDy_v & dDz_v & Z0_i \\ 0 & 0 & 0 & 1 \end{bmatrix} \quad [2]$$

In this matrix, the column vector $[dx_i x_v, dy_i x_v, dD_{xv}, 0]^T$ is the representation in image space, i.e., $X_i Y_i D$-coordinates, of a unit vector in the x-dimension in permuted space (i.e., $X_v$).

The column vectors $[dx_i y_v, dy_i y_v, dDy_v, 0]^T$ and $[dx_i z_v, dy_i z_v, dDz_v, 0]^T$ are likewise the representations in image space of the unit vectors in the y- and z-dimensions in permuted space, respectively. The image space coordinates $[X0_i, Y0_i, Z0_i]^T$ represent the zero point or origin of permuted space.

Because $M_p$ can be determined by matrix multiplication from Equation 1, each of the entries in Equation 2 is a known value.

Decomposition of $M_p$

From FIG. 2, we see that the transformation $M_p$ is equivalent to $$M_p = D \times R. \quad [3]$$

That is, we map a point or vector in permuted coordinates, i.e., $X_v Y_v Z_v$-space, into image space by first mapping it to coordinates in sample space, i.e., $X_s Y_s Z_s$-space, using the resample transformation R, then mapping the result to image space using the depthwarp transformation D. Equation 2 should, of course, produce the same results as Equation 1.

By the definition of xy-image order, the $x_s$- and $y_s$-coordinates in sample space are exactly the same as the $x_i$- and $y_i$-coordinates in image space. Moreover, the zero point in sample space maps to the point (0, 0, depth0) in image space. Only the $z_s$-coordinate of sample space is transformed by the depthwarp transformation. Therefore, we write D as:

$$D = \begin{bmatrix} 1 & 0 & 0 & 0 \\ 0 & 1 & 0 & 0 \\ dDx_s & dDy_s & dDz_s & depth0 \\ 0 & 0 & 0 & 1 \end{bmatrix} \quad [4]$$

From this Equation, it can be seen that an arbitrary point $[x_s, y_s, z_s, 1]^T$ in sample space maps to:

$$[x_s, y_s, dDx_s \cdot x_s + dDy_s \cdot y_s + dDz_s \cdot z_s + depth0, 1]^T$$

in image space.

None of the four entries of the third row of D are known. However, we can derive all of them from other information and from the assumptions, specifically, the assumption that the x- and y-dimensions of image space are the same as those of sample space, from the specification of the viewport as a subset of image space, and from the matrix $M_p$ of Equation 3.

The matrix representation of R can also be restated from Equation 3 and the definition of xy-image order as follows:

$$R = \begin{bmatrix} dx_s x_v & dx_s y_v & dx_s z_v & X0_s \\ dy_s x_v & dy_s y_v & dy_s z_v & Y0_s \\ 0 & 0 & dz_s z_v & Z0_s \\ 0 & 0 & 0 & 1 \end{bmatrix} \quad [5]$$

This follows because the $x_s$- and $y_s$-axes of sample space are exactly the same as the $x_i$- and $y_i$-axes of image space. Therefore, the values in first two rows of R are exactly the same as the first two rows of $M_p$. However, the notation is changed by replacing "i" with "s" in each entry.

The third row is different. In sample space, the planes of constant $z_s$ are parallel to planes of constant $z_v$ in permuted space, i.e. parallel to the base plane. Therefore, a change in either $x_v$ or $y_v$ produces no change at all in $z_s$. Therefore, the first two entries of the third row of R are zero. The last two entries of the third row, $dz_s z_v$ and $Z0_s$, are still unknown.

Solving for the Unknowns in D

Note that the lower left quadrant of R in Equation 5 zero. Therefore, R can be rewritten as $$R = \begin{bmatrix} A & B \\ 0 & C \end{bmatrix}, \quad [6]$$

where A, B, and C are 2×2 matrices. Recall from above that all of the entries of A and B are known, butt hat C still contains two unknown entries. By substituting the matrix representations of $M_p$ and D into Equation 3, we get $$\begin{bmatrix} dx_i x_v & dx_i y_v & dx_i z_v & X0_i \\ dy_i x_v & dy_i y_v & dy_i z_v & Y0_i \\ dDx_v & dDy_v & dDz_v & Z0_i \\ 0 & 0 & 0 & 1 \end{bmatrix} = \begin{bmatrix} 1 & 0 & 0 & 0 \\ 0 & 1 & 0 & 0 \\ dDx_s & dDy_s & dDz_s & depth0 \\ 0 & 0 & 0 & 1 \end{bmatrix} \times R. \quad [7]$$

Specifically, the third row becomes $$[dDx_v, dDy_v, dDz_v, Z0_i] = [dDx_s, dDy_s, dDz_s, depth0] \times R. \quad [8]$$

Because the lower left quadrant of R is zero, we can see that $$[dDx_v, dDy_v] = [dDx_s, dDy_s] \times A \quad [9]$$

Taking the transpose, Equation 9 is equivalent to $$\begin{bmatrix} dDx_v \\ dDy_v \end{bmatrix} = (A^T) \times \begin{bmatrix} dDx_s \\ dDy_s \end{bmatrix} \text{ and} \quad [10]$$

$$\begin{bmatrix} dDx_s \\ dDy_s \end{bmatrix} = (A^T)^{-1} \times \begin{bmatrix} dDx_v \\ dDy_v \end{bmatrix} = \begin{bmatrix} dx_s x_v & dy_s x_v \\ dx_s y_v & dy_s y_v \end{bmatrix} \begin{bmatrix} dDx_v \\ dDy_v \end{bmatrix} \quad [11]$$

Since, $dx_s x_v$, $dy_s x_v$, $dx_s y_v$, and $dy_s y_v$ are known from R, and since $dDx_v$ and $dDy_v$ are known from $M_p$, we now have calculated two unknown entries of D, i.e., $dDx_s$ and $dD_s$, by matrix inversion and multiplication.

Spacing of Sample Points Along Rays

The third unknown, $dDz_s$, is determined as follows. It is $$dDz_s = \frac{depthFar - depthNear}{sampleCount}. \quad [12]$$

That is, dDzs represents the spacing between sample points along a ray, as measured in depth units. Equation 12 divides the total distance from the front to the back of the viewport, measured in depth units, and divides by the number of samples in that interval. Note that $dDz_s$ may be either positive or negative, depending upon whether depth values increase toward the image plane or away from the image.

The preferred method for calculating the spacing of sample points along rays provides for a constant change in the depth value per sample step, independent of the rotation of the volume object in the viewport and independent of the anisotropy or shear inherent in the volume data set itself. Although it is not strictly necessary, from the point of view of image processing, we believe that this an advantage. It should be noted, that sample spacing can also be determined using other methods.

For example, FIGS. 11a–b show two views of a cross-section of an anisotropically sampled volume data set 1100. Here, voxels are represented by the x-marks 1101, the arrows 1102 represent two view (ray) directions, and the hash marks 1103 on each arrow represent sample points along rays.

The hash marks on the arrow in FIG. 11a are exactly the same distance apart as they are on the arrow in FIG. 11b, whether measured in image; world, or physical space. In FIG. 11a, the view vector is nearly horizontal, and so the $z_v$-axis of permuted space is the horizontal axis. The spacing of the sample points is approximately two samples per voxel slice. In FIG. 11b, the view vector is nearly vertical, so the vertical axis is chosen as the $z_v$-axis of permuted space. The spacing of sample points along the right arrow is approximately three samples per voxel slice.

Estimating Depth0

Selecting a value when depth0, the depth of the origin of sample space, turns out to be non-trivial. Because of the skewed nature of sample space with respect to the viewport, depth0 may vary with the direction of viewing the volume. This can be understood better by referring to FIGS. 12a–c, which depicts a bird's eye view of a viewport in which a volume object is positioned three different ways. The y-dimension of he viewport is perpendicular to the page.

In each view, the image plane is at the left and the view direction is shown by a vector emanating from eye point 1201 and pointing from left to right. The viewport is shown by a box 1202 with solid lines; the length of the viewport is parallel to the view vector, and the depth values depthNear 1206 and depthFar 1207 are shown marking the extremes of the box. The image plane is perpendicular to the page, with the x-dimension in the plane of the page, parallel to $x_s$ in the top view and the y-dimension perpendicular to the page.

Figure 12A:
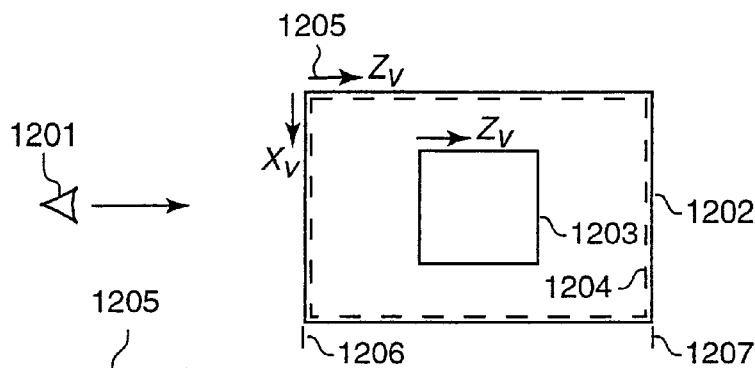
FIGS. 12a–c shows three bird's eye views of a view port with a volume object.

FIG. 12a shows a volume object, i.e., the small box 1203 with the heavy outline, being viewed perpendicular to one of its faces. In this case, the assignment of depth0 is easy; it can be set to depthNear 1206. Sample space is then a three-dimensional space that fits exactly in the viewport. An xz-cross-section of sample space is outlined by dashed lines 1204. This sample space includes all points within the viewport. For example, if a polygon object were drawn within the viewport, it would lie within sample space and could be partially embedded within the volume object.

Figure 12B:
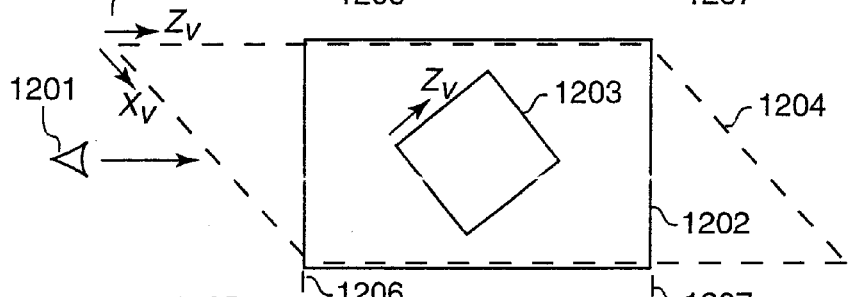

FIG. 12b shows the volume object rotated about an axis perpendicular to the page. The $z_v$-axis as selected by the method described above for the permuted transformation. Because the slices of sample space are parallel to the face of the volume most nearly parallel to the image plane, sample space is skewed by the amount of the rotation of the volume object. On the assumption that it is desirable that sample space include all points within the viewport, for example, for the purpose of embedding polygon objects in the viewport, the front and back boundaries of sample must be stretched, as shown by the dashed outline 1202. The $x_s$- and $z_s$-axes of sample space are shown by the arrows and labels.

The origin of sample space is at the corner 1205 represented by the extreme upper left of the dashed outline. The $x_s$- and $y_s$-dimensions of sample space are exactly the same as those of the top view. However, depth0, the depth value of the origin of sample space is quite different. It must be calculated so that every point between depthNear and depthFar and within the viewport has the correct depth value as specified by the viewport. For example, the lower left corner 1206 of the dashed outline must have a depth value of depthNear. The depth can be calculated incorrectly, for example, if the correct depth value exceeds the range supported in hardware registers at locations such as 1205 in FIG. 12b. In the preferred embodiment, the depth computation logic supports signed depths and an increased maximum depth value in order to reduce this problem.

Figure 12C:
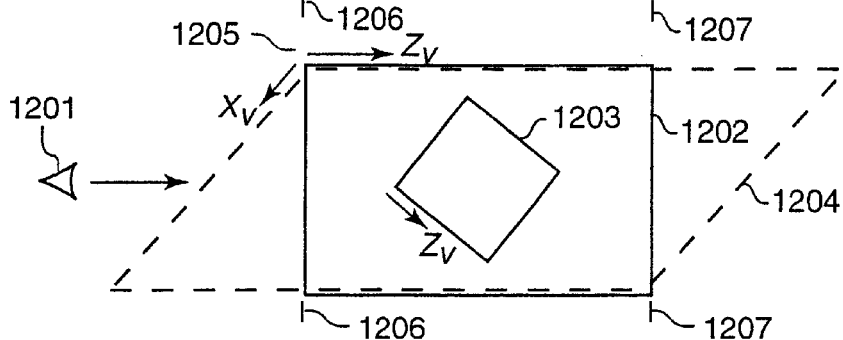

FIG. 12c shows the same volume object rotated in the viewport in the other direction. Therefore, it has a different $z_v$-axis than the middle view. As a result, sample space is skewed in the other direction. In this case, depth0 can be assigned the value depthNear, but sample space includes points to the left of the image plane with depth values nearer to the image plane than depthNear.

It is possible to imagine, but difficult to draw, a similar skewing of sample space in the yz-dimensions. Moreover, it is possible that sample space skews in one direction in the xz-dimension, as represented by the middle view, and in the other direction in the yz-dimension, as represented by the bottom view. To visualize such a skewing requires a 3D model.

However, regardless of the skewing, we can determine the value of depth0 from the entries of D that we obtained as described in the section for solving for the unknowns for D, above. First note that the four corners of slice zero of sample space within the viewport have $x_s y_s$-coordinate of (0, 0)
(0, height)
(width, 0)
(width, height)

where width and height are the width and height of the image plane of the viewport. Then the depth values of these four corners can be determined from the depth transformation D of Equation 4 by matrix multiplication.

They are, respectively, depth0 height*$dDy_s$+depth0 width*$dDx_s$+depth0 width*$dux_s$+height*$dDy_s$+depth0.

If depthNear is less than depthFar, i.e., depth values increase from the viewer toward the object), then select the maximum depth value of these four corners. This depth value should be less than or equal to depthNear, i.e., the corner with the maximum depth value should lie on, or in front of, the front of the viewport. For simplicity, assign it the depth value depthNear. That is, depthNear=max(depth0, height*dDy+depth0, width*$dDx_s$+depth0, width*dDxs+height*$dDy_s$+depth0)=depth0+max(0, height*$dDy_s$, width*$dDx_s$, width*$dDx_s$+height*$dDy_s$).

Conversely, if depthNear is greater than depthFar, i.e., if depth values increase toward the image plane, then select the minimum of these four corners. That is, depthNear=depth0 +min(0, height*$dDy_s$, width*$dDx_s$, width*$dDx_s$+height*$dDy_s$).

This completes the derivation of the depth matrix D. One caution is necessary: that the depth values do not overflow or underflow the limits of depth counters in the regions of sample space outside the viewport, i.e., in the triangular regions to the left and right of the viewpoint in the FIGS. 12b–c.

$R^{-1}$ Rendering Parameters

We can determine the remaining unknowns of R, the resampling transformation. By taking the dot product of the third and fourth columns of R with the third row of D, we obtain the entries $dDz_v$ and $Z0_t$ of $M_p$, i.e., $$dDz_v = dDx_s \cdot dx_s z_v + dDy_s \cdot dy_{sv} + dDz_s dz_s z_v \qquad [13],$$

and $$Z0 = dDx_s \cdot X0_s + dDy_s \cdot Y0_s + dDz_s \cdot Z0_s + \text{depth0}. \qquad [14]$$

Solving Equation 13 for $dz_s z_v$, we get $$\frac{dDz_v - (dDx_s \cdot dx_s z_v) - (dDy_s \cdot dy_s z_v)}{dDz_s} = dz_s z_v. \qquad [15]$$

Similarly, solving Equation 14 for $Z0_s$, we get $$\frac{Z0_i - dDx_s \cdot X0_s - dDy_s \cdot Y0_s - \text{depth0}}{dDz_s} = Z0_s. \qquad [16]$$

Thus, R and D are now both known. The entries of D are assigned to registers of the rendering engine, see below. R must be inverted before it can be used.

From Equations 15 and 16, we now know the values of all of the entries of R. Therefore, it is a simple matter of inverting R to obtain the transformation of sample space into permuted space. This can be done directly by ordinary matrix inversion algorithms.

Note that $R^{-1}$ is a linear transformation from sample space to permuted space. Therefore, it can be re-written as a matrix in homogeneous coordinates as follows:

$$R^{-1} = \begin{bmatrix} dx_v x_s & dx_v y_s & dx_v z_s & OriginX_v \\ dy_v x_s & dy_v y_s & dy_v z_s & OriginY_v \\ 0 & 0 & dz_v z_s & OriginZ_v \\ 0 & 0 & 0 & 1 \end{bmatrix}. \quad [17]$$

The entries of this matrix are the values needed to render the volume data set according to the xy-image order. These are the values that are written to the rendering registers of the rendering pipelines as described in the following section.

Spacing of Sample Points within a Slice of Sample Space

Figure 19:
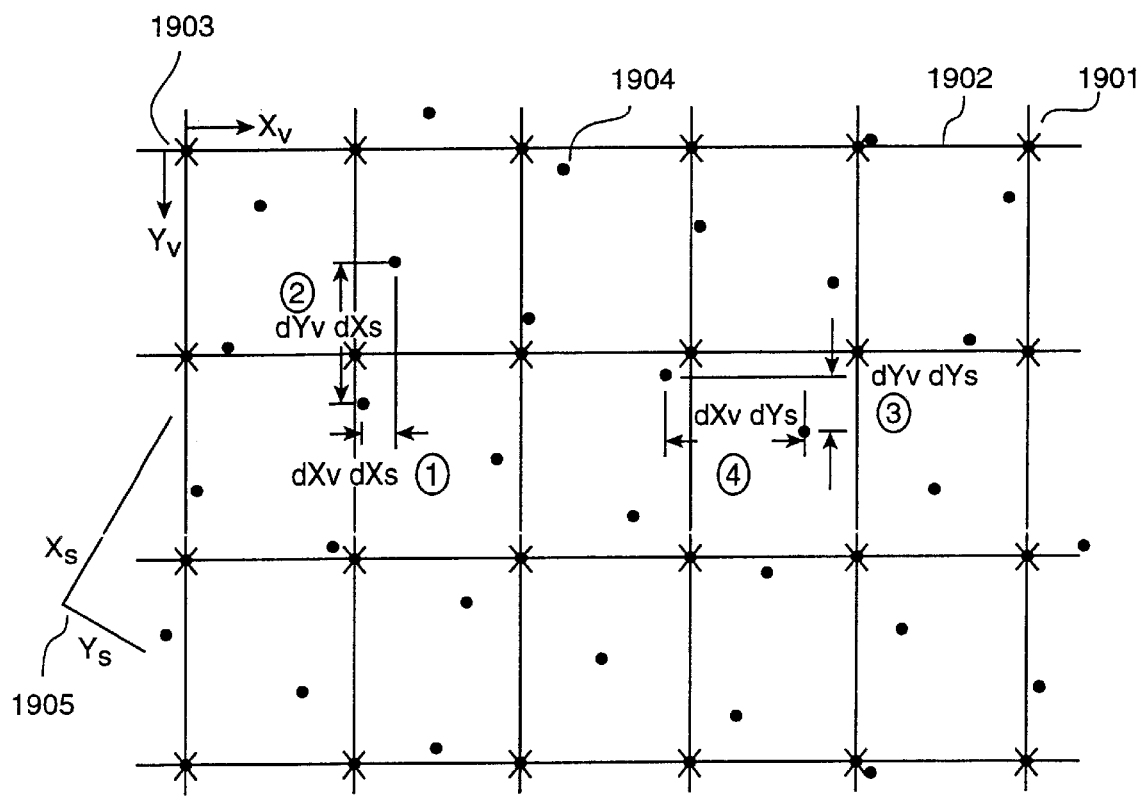
FIG. 19 shows a grid of rays intersecting a slice of voxels at an arbitrary angle.

As stated above, for xy-image order rendering, sample space comprises rays that pass through pixels on the image plane, or alternatively, for shear-warp, through a base plane. With the invention, slices of sample space (planes of sample points) are always parallel to slices of permuted space (planes of voxels). However, because of xy- image order traversal, the x- and y-axes of sample space are not necessarily parallel to the axes of permuted voxel space. Therefore, the grid of rays intersecting a slice of voxels can be at an arbitrary angle, as shown in FIG. 19. Moreover, rays which are organized in a rectangular pattern on the image plane may intersect a voxel slice in a parallelogram pac tern.

In FIG. 19, voxels 1901 are illustrated by "x" symbols and are aligned to a rectangular grid 1902. The $x_v$- and $y_v$-axes 1903 in permuted coordinates are shown in the upper left corner, labelled $X_v$ and $Y_v$. Sample points are the points where rays cast from the image plane intersect the same slice. These are illustrated by solid dots 1904 and are arranged on a non-rectangular grid. The x- and y-axes 1905 of sample space are shown in the lower left corner and are labelled $X_s$ and $Y_s$.

The registers dXvdXs, dYvdXs, dXvdYs, and dYvdYs, shown in Table 2, specify how to find the fixed point subvoxel coordinates of a point in sample space from those of a neighboring point in the same slice.

TABLE 2

| Register Name | Description |
| --- | --- |
| dXvdXs | Increment in x-direction in permuted space for each step in x-direction in sample space. |
| dYvdXs | Increment in y-direction in permuted space for each step in x-direction in sample space. |
| dXvdYs | Increment in x-direction in permuted space for each step in y-direction in sample space. |
| dYvdYs | Increment in y-direction in permuted space for each step in y-direction in sample space. |

In particular,register dXvdXs stores how many units in the $X_v$-direction it is necessary to step for one unit in the $x_s$-direction; this is $dx_v x_s$ of Equation 17 and is labeled 1 in FIG. 19. The register value dYvdXs indicates how many units in the $Y_v$-direction it is necessary to step for one unit in the $x_s$-direction; this is $dy_v x_s$ of Equation 17 and is labeled 2 in the FIG. The value dYvdYs shows how many units in the $Y_v$-direction it is necessary to step for one unit in the $y_s$-direction; this is $dy_v y_s$ of Equation 17 and is labeled 3 in FIG. 19, and the value dXvdYs shows how many units in the $X_v$-direction it is necessary to step for one unit in the $y_s$-direction; this is $dx_v y_s$ of Equation 17 and is labeled 4 in FIG. 19.

We now decribe a preferred implementation for a rendering engine that renders a volume data set in our xy-image order.

Pipeline Organization

Figure 13:
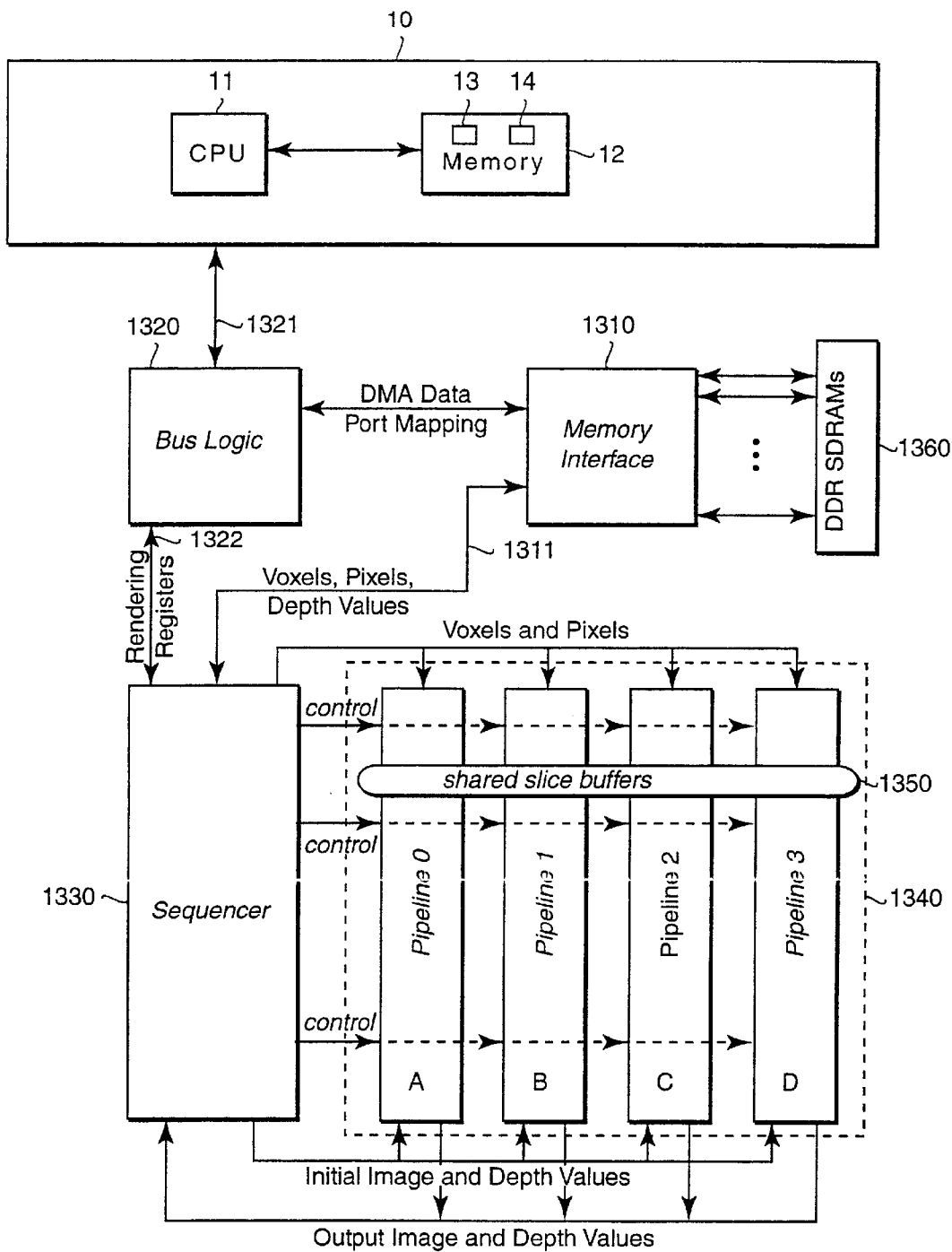
FIG. 13 is a block diagram of a rendering engine according to the invention.

FIG. 13 shows the overall organization of a volume rendering engine 1300 according to our invention. As an advantage, the engine 1300 is fabricated as a single ASIC. The principal modues of the rendering engine are a memory interface 1310, bus logic 1320, a sequencer 1330, and four parallel pipelines 1340. Except for a pair of slice buffers 1350, which span all four pipelines, the pipelines (A, B, C, and D) operate independently of each other.

Memory Interface

The memory interface 1310 controls eight double data rate (DDR) synchronous DRAM channels 1360 that comprise the rendering memory. The rendering memory provides a unified storage for all data 1311 needed for rendering volumes, i.e., voxels, input and output images, depth values, look-up tables, and command queues. The memory interface 1310 implements all memory accesses to memory 1360, arbitrates the requests of the bus logic 1320 and the sequencer 1330, and distributes array data across the modules and memory 1360 for high bandwidth access and operation.

Bus Logic

The bus logic 1320 provides an interface with a host computer system 10. The host includes a CPU 11 and a main memory 12. The main memory can store graphical application software and graphic drivers communicating with an operating system. The software executes in the CPU. In the preferred embodiment, the host generates the values for the rendering registers of Table 2.

If the host 10 is a personal computer (PC) or workstation, then the bus can be a 64-bit, 66 MHz PCI bus 1321 conforming to version 2.2 of the PCI specification, for example. The bus logic also controls direct memory access (DMA) operation for transfering data to and from the memory 1360 via the memory interface 1310. The DMA operations are burst-mode data transfers.

The rendering engine acts as a PCI bus master for this purpose. The bus logic also provides access to internal registers 1322 and main memory 12. These accesses are direct reads and/or writes of individual registers and individual locations in the memory, initiated by the host computer or by some other device on the PCI bus. The bus logic also, interprets rendering commands for efficient control of rendering engine operations. The bus logic also sends register values directly to the sequencer 1330 for controlling rendering operations and receives status back from the sequencer, for example, the registers of Table 2.

Sequencer

The sequencer 1330 controls the volume rendering engine. It determines what data to fetch from the memory, dispatches that data to the four pipelines 1340, sends control information such as interpolation weights to the individual pipelines at the right time, and receives output data from rendering operations. The sequencer itself is a finite state machine controlled by a large number of registers. These are typically written by the bus logic 1310 in response to load register commands. Internally, the sequencer maintains the counters needed to step through sample space one section at a time. A section is a rectangular region on the image plane that includes up to, e.g., 24×24 pixels. Alternately, a section can bethought of as a set of rays and all of the sample points along those rays. The sequencer also controls converting sample coordinates to permuted voxel coordinates, and generates the control information needed by the stages of the four pipelines.

Pipeline and Miniblocks

Figure 14:
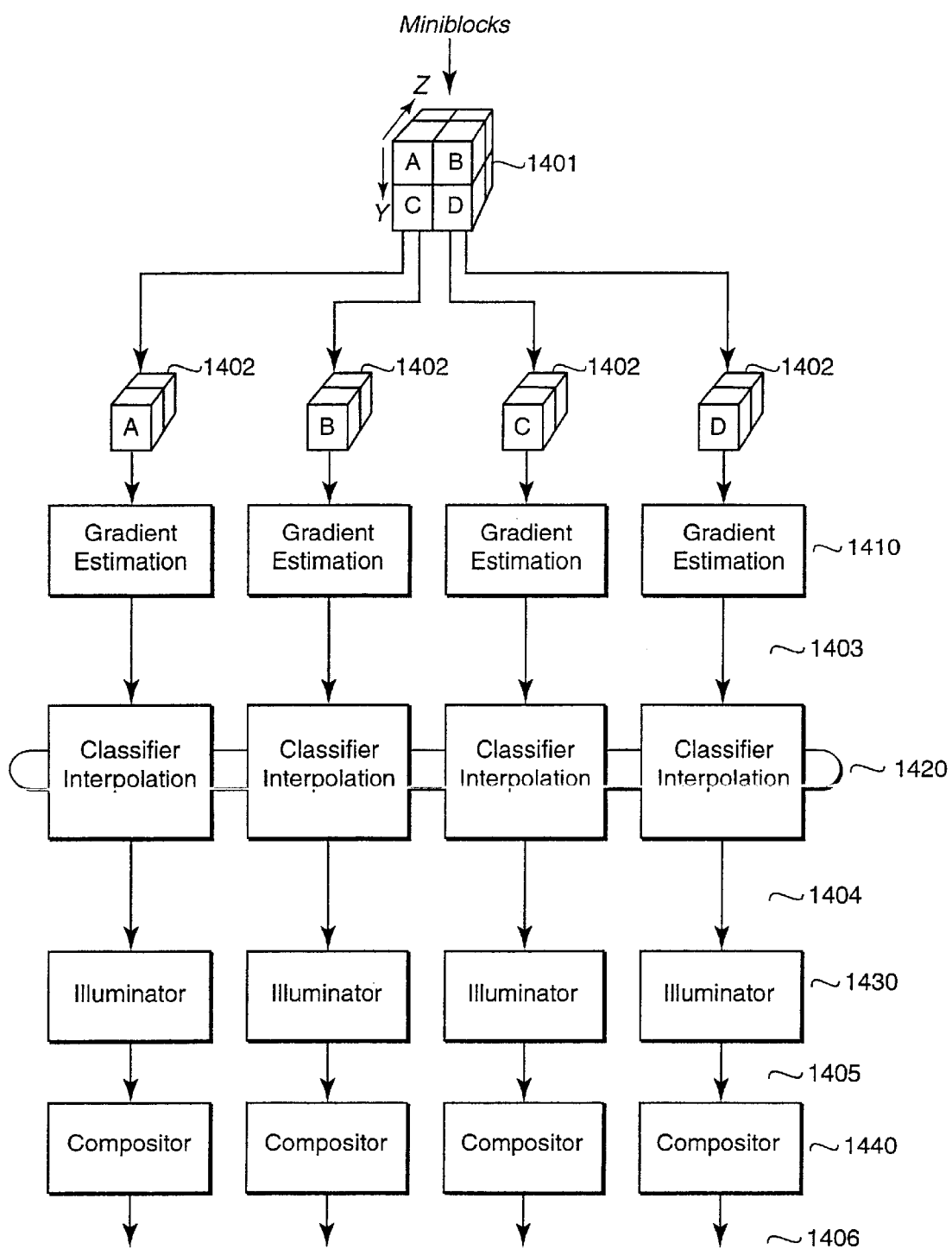
FIG. 14 is a block diagram of four parallel pipelines and miniblocks.

FIG. 14 shows the four rendering pipelines in greater detail, and it also shows how data and rendering operations are distributed among the piplines. Each pipeline includes a gradient estimation stage 1410, a classifier-interpolator stage 1420, an illuminator stage, 1430, and a compositer stage 1440.

Voxels are stored in the memory 1360 as miniblocks 1401, that is, small cubic arrays of 2×2×2 voxels each. During rendering, the sequencer 1330 causes the memory interface to read streams of miniblocks. These are presented to the pipelines at the rate of one miniblock per clock cycle.

Miniblocks are read from the volume data set in x-y-z-order. That is, they are read sequentially in the x-direction to fill up a row of a section, and row-by-row in the y-direction to fill a slice, and slice-by-slice in the z-direction to render the entire section.

As each miniblock arrives via the memory interface 1310, it is permuted according to the permutation transformation P as described above by orienting the axes according to the view direction. The miniblock is then decomposed into four 1×1×2 arrays of voxels 1402, that is, four pairs of voxels aligned in the z-direction. One pair is forwarded to each pipeline as shown in FIG. 14.

Each pair of voxels is passed through the gradient estimation stage 1410 to obtain gradient values at each voxel as described for FIGS. 1a–b. As a result of the central different operator used to obtain gradients, the output voxels and gradients are offset by one unit in each dimension from the inputs. This requires a small amount of data exchange between pipelines.

From the gradient estimation stage, the voxels and gradients 1403 are passed to the classifier-interpolator 1420. In this stage, voxel fields are converted to RGBα values and, along with gradients, are interpolated to values at sample points along rays. As stated above, sample slices are parallel to voxel slices. The classification and interpolation steps can occur in either order. Note that the classifier-interpolator has one pair of slice buffers 1360 that are shared among all four pipelines.

Figure 18:
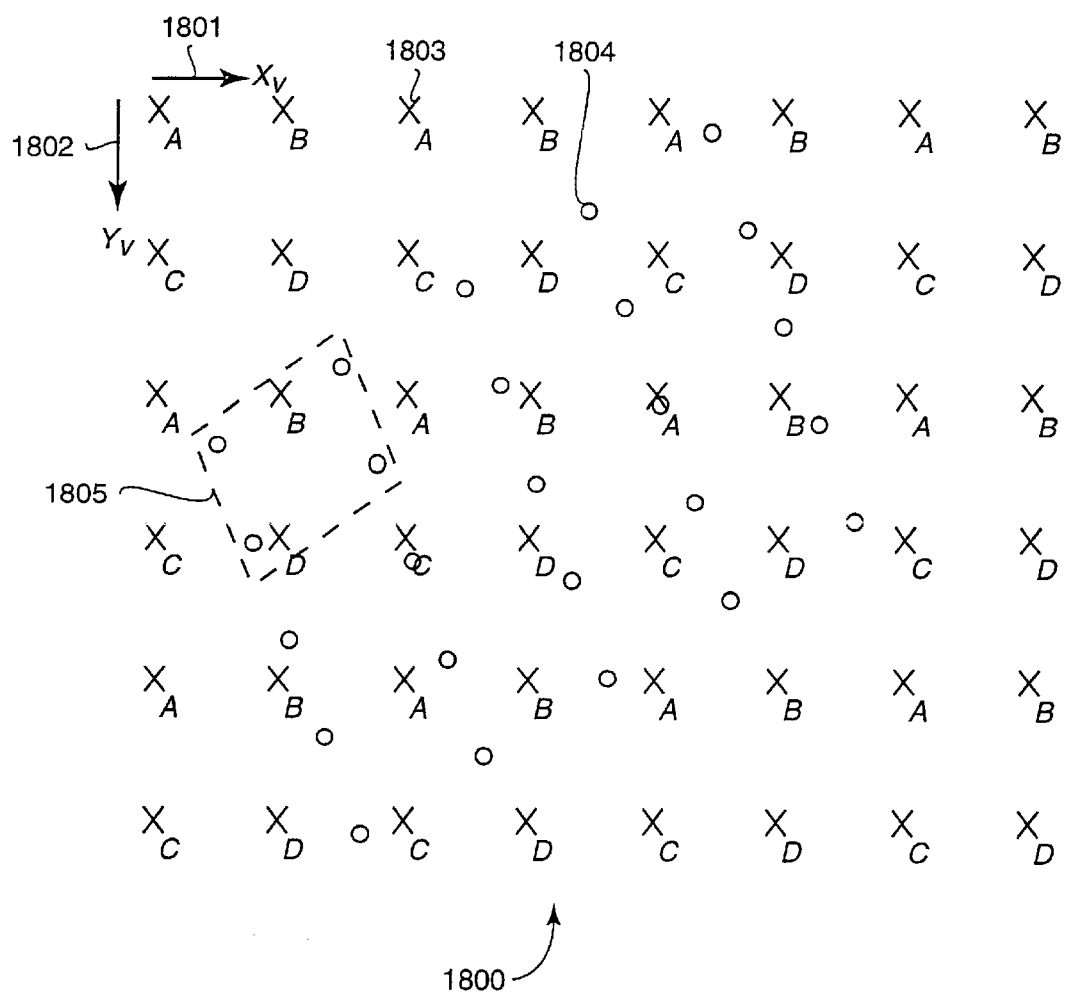
FIG. 18 are z-interpolated samples in a sample slice buffer.

The output 1404 of the four classifier-interpolators of the four pipelines is an array of RGBα values and gradients at a 2×2 array of points in sample space called a stamp 1805, see FIG. 18. The points of a stamp always lie in the same slice (plane) of sample space but will be aligned with the rays. When rays pass through pixels on the image plane, we call it xy-image order, because the $x_s$- and $y_s$-coordinates are the same as those of image space.

The stamp of RGBα values and gradients is next passed to the four illuminators 1430. These apply well known Phong shading using reflectance maps. The illuminator of each pipeline is independent of those of the other pipelines, in the sense that they do not exchange data during rendering. Naturally, they all operate synchronously according to the same clock.

The gradients are consumed in the illuminator stages except when the rendering operation specifies the output of gradients. In the later case, the three gradient components are substituted for the red, green, and blue color components in the pipelines.

The output 1405 of the illuminator stage of each pipeline is an illuminated RGBα value representing the color contribution of its sample point. This is passed to the compositor stage. The compositor 1440 combines the RGBα values of the its rays into pixels. At the end of rendering a section, the output 1406 of the four compositor stages are read out, a stamp at a time, for storage in rendering memory 1360.

The following sections present each of the blocks in more detail.

Gradient Estimation

Figure 15:
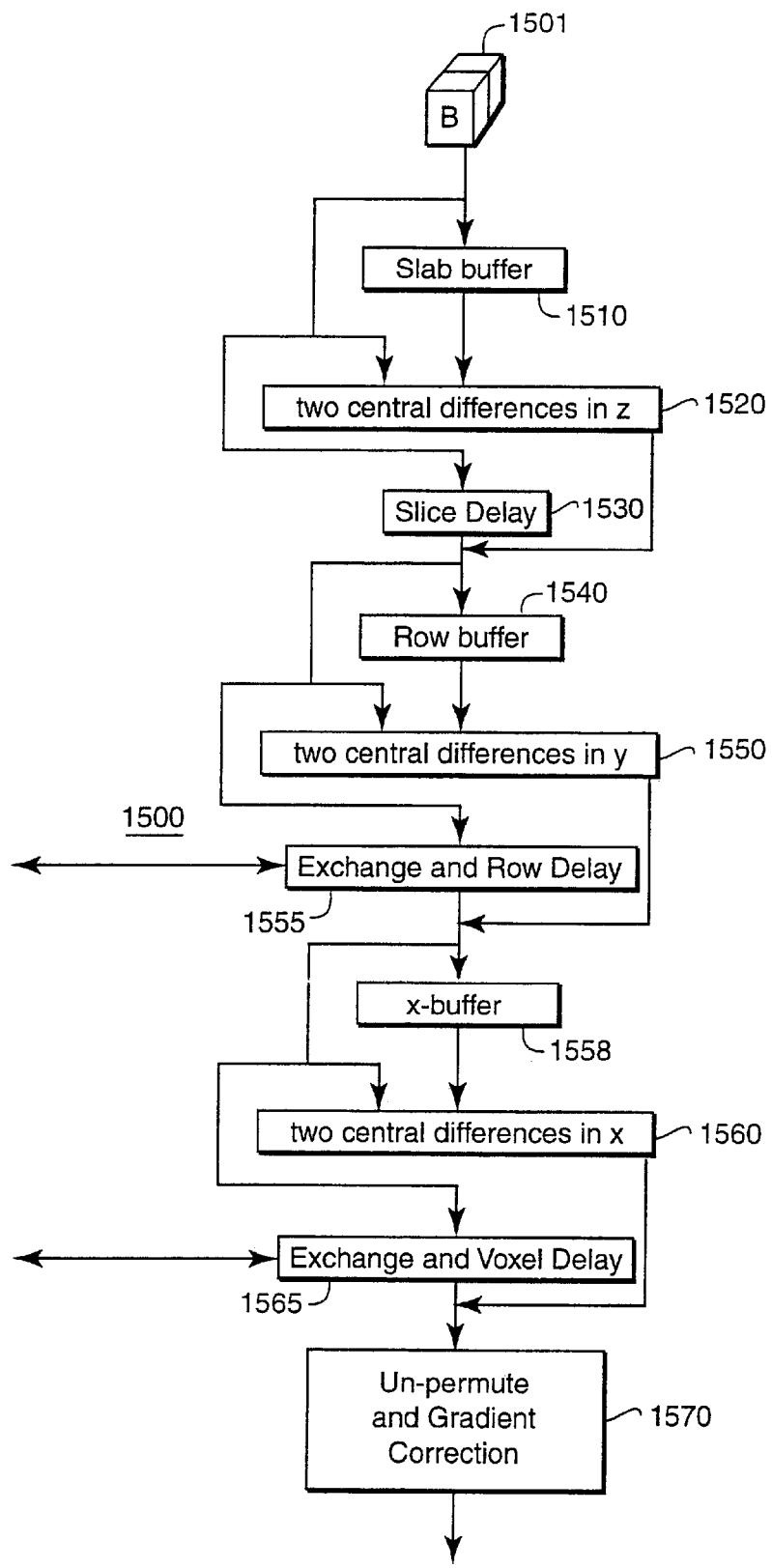
FIG. 15 is a block diagram of a gradient estimation stage of the pipelines.

FIG. 15 shows the gradient estimation stage 1500 of one pipeline. As described above, mini-blocks of eight voxels are partitioned into four pairs of voxels arranged one behind the other in the z-dimension. One pair is passed to each pipeline. That is, entering the top of a pipeline at the beginning of each cycle is a pair of voxels 1501 at permuted coordinates (x, y, z) and (x, y, z+1), for some value of x, y, and z, where z is an even number.

This pair of voxels is written into a slab buffer 1510 of size 16×16×2 32-bit voxels, or larger. Therefore, the set of four pipelines implements a collective slab buffer large enough to render a slice of a section of size at any view angle. The pair of input voxels also feeds one side of a pair of z-central difference modules 1520. The output of the two central difference modules 1520 is fed by fields of a pair of voxels with the same x- and y-coordinates read from the slab buffer, if any. The two central difference modules therefore calculate the two differences $F_z(x, y, z-2)-F_z(x, y, z)=G_z(x, y, z-1)$, $F_z(x, y, z-1)-F_z(x, y, z+1)=G_z(x, y, z)$, where $F_z(x, y, z)$ is the value of the field of the voxel at coordinates (x, y, z) upon which the z-component of the gradient is based.

Note that this pair of central differences is offset by one unit in the z-direction from the voxel coordinates. Therefore, a one-slice delay 1530 is included to delay the pair voxels in order to align these voxels with the newly computed z-components of the gradients, i.e., the $G_z$'s.

Then, the aligned set comprising a pair of voxels and a pair of $G_z$'s is stored in a row buffer 1540 of size 16×1×2, i.e., a row buffer sixteen units wide in the x-dimension, one unit high in the y-dimension, and two units deep in the z-dimension. Each element of the row buffer stores the original voxel value, up to 32-bits, and the corresponding $G_z$ value (12-bits plus sign). The pair of input (voxel-$G_z$) values is also fed to one side of a pair of y-central difference modules 1550.

The other side of these two modules obtains its input from the pair of (voxel-Gz) values in the row buffer 1540 with the same x- and z-coordinates, but with a y-coordinate of y-2. The y-central difference modules therefore calculate the two differences $F_y(x, y-2, z-1)-F_y(x, y, z-1)=Gz(x, y-1, z-1)$, $F_y(x, y-2, z)-F_y(x, y, z)=G_z(x, y-1, z)$, where Fy(x, y, z) is the value of the field of the voxel at coordinates (x, y, z) upon which the y-component of the gradient is based.

Note that as the pipeline processes rows of voxel-$G_z$ values within a slab, it only sees alternate rows. The intervening rows, e.g., y-coordinates of y-1, are processed by another pipeline as a result of the way mini-blocks are partitioned and distributed among pipelines. This causes the y-central differences to be misaligned by one unit in y from the pair of input voxel-$G_z$ values. To fix this misalignment, the pipeline exchanges its pair of input voxel-$G_z$ values with the pipeline with the same x-coordinate but different y-coordinate. The pair of voxel-$G_z$ values are delayed by one row cycle. This is done by the exchange and delay block 1555.

The resulting output of this section of the gradient estimation stage is the original voxel, the $G_z$ value, and the $G_y$ value at each of the coordinates (x, y−1, Z−1) and (x, y−1, z).

It is easy to see how this process is repeated for the x-component of the gradient $G_x$. This time, the x-buffer 1558 is one element deep and contains the original voxel, the $G_z$ value, and the $G_y$ value for coordinate (x−2, y−1, z−1). The pair of x-central difference engines 1560 produce $F_x$(x−2, y−1, z−1)-$F_{x(x, y)}$−1, z−1)=$G_x$(x−1, y−1, z−1), $F_x$(x−2, y−1, z)-$F_x$(x, y−1, z)=$G_{x(x)}$−1, y−1, z), where Fx(x, y, z) is the value of the field of the voxel upon which the x-component of the gradient is based. Again, the input value comprising the original voxel and the $G_z$ and $G_y$ values must be exchanged with those of the pipeline with the opposite x-coordinate, via block 1565, in order to align the quantities with the newly computed $G_x$ values and one voxel delay.

The final section 1570 of the gradient estimation stage perform the final "cleanup" of the gradient. First, the gradient is "un-permuted" so that the $G_x$, $G_y$, and $G_z$ components are converted to $G_u$, $G_v$, and $G_w$ in object coordinates. Second, a gradient correction matrix is applied, if necessary, to correct for anisotropy and shear in the original data set, as described above. The gradient correction matrix is a 3×3 upper triangular matrix that transforms the gradient from object space 201 to physical space 202, see FIG. 2. This enables a more accurate implementation of illumination.

Third, the gradient components are rounded down from their internal precision in the gradient estimator to a standard format and are carried forward as repeating fractions in the range [0, . . . , 1] plus a sign bit.

Note there are no stalls internal to the gradient estimator stage 1500. However, there may be stalls because of unavailability of input data or because the next module may not be able to accept the output. At the top of the gradient estimator is an elastic store, i.e., a FIFO, into which the input voxel pairs are written. If it takes longer for the memory interface to read data from memory than it does to process it, this FIFO empties and the gradient estimator simply waits.

Likewise, if the next stage in the pipeline, i.e., the classifier-interpolator, cannot accept more voxels and gradients, then the gradient estimator simply stops reading and processing voxels. There is a small elastic store at the bottom of the gradient estimator to ensure that data are not lost during this kind of stall.

Classifier-Interpolator

Figure 16:
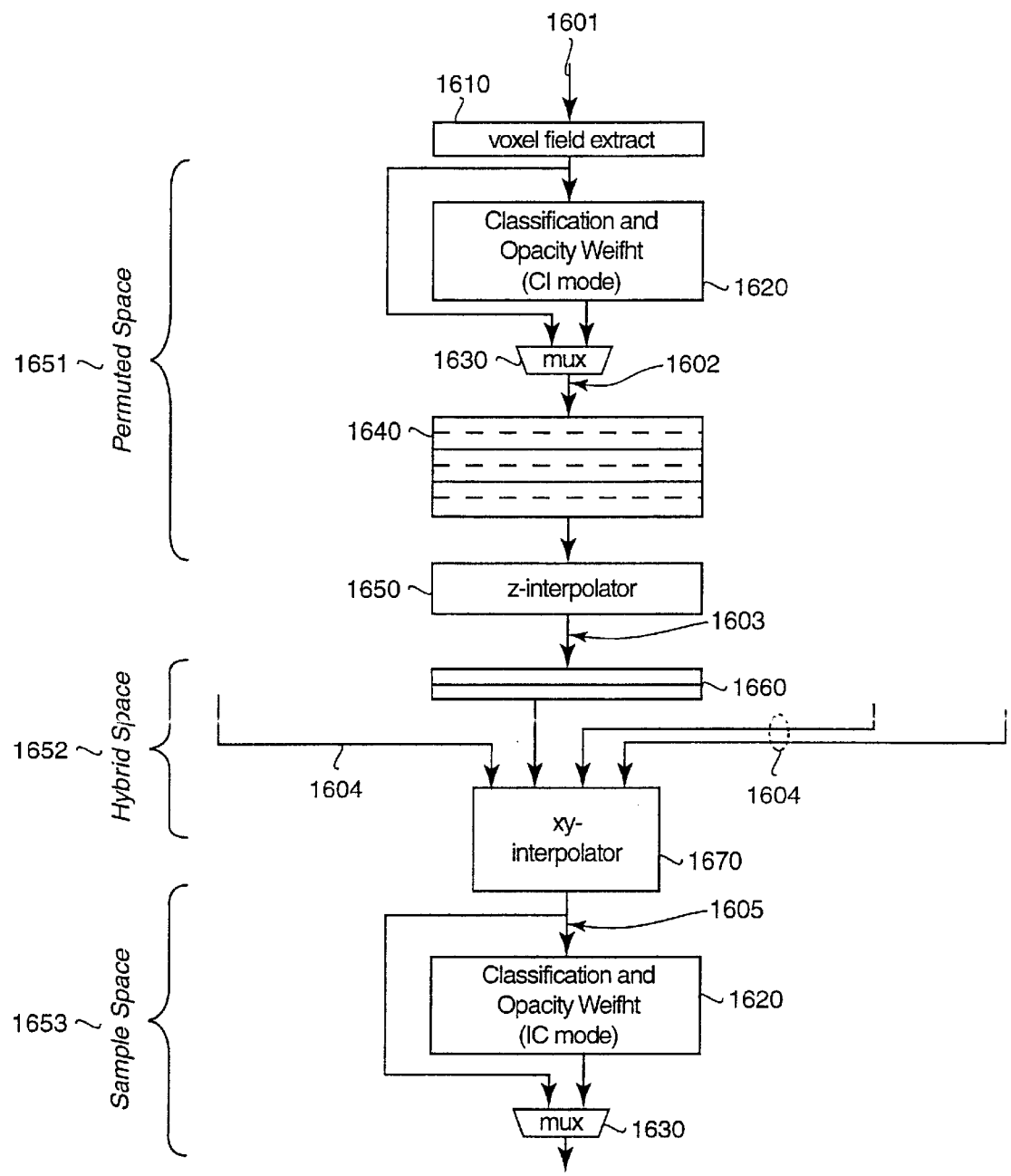
FIG. 16 is a block diagram of a classifier-interpolator stage of the pipeline.

FIG. 16 is an overview of the classifier-interpolator stage. This stage includes voxel field extraction unit 1610, a classification and opacity weight unit 1620, which may be connected via MUX's 1630 either near the top of the pipeline or near the bottom to implement a cross connected architecture. The stage also includes three pairs of slice buffers 1640 for storing raw or classified voxels and their gradients, a z-interpolation unit 1650 for interpolating (sampling) raw or classified voxel fields and gradient components in the z-dimension, two sample buffers 1660 for holding slices of z-interpolated values and gradients, and xy-interpolation unit 1670 for interpolating (sampling) z-interpolated sample values in the sample buffers in the x- and y-dimensions to obtain their values at points in sample space.

Preprocessing and Classification

Data 1601 arrives at the classifier-interpolator (CI) in the form of a stream of voxels with their associated gradients from the gradient estimation stage of FIG. 15. The voxels have integer permuted coordinates, i.e., $x_v$, $y_v$, $Z_v$. In the preferred embodiment; it takes either one or two clocks to send a pair of voxels and gradients, depending upon the rendering mode.

In particular, if we are rendering with classification before interpolation, i.e., "CI" mode, then the gradient estimator requires two clocks to deliver a pair of voxels and gradients. If we are rendering with classification after interpolation, i.e., "IC" mode, then the gradient estimator requires one clock to deliver a pair of voxels and gradients. This is because the interpolation buffer logic can accept two voxels and gradients per clock, but the classifier can only accept a single voxels and gradient per clock. This saves gates, since accepting two voxels per clock would require twice as many classification lookup tables. Less data is classified in IC mode, since the amount of data is reduced in the interpolator due to edge effects.

Whether before or after interpolation, the voxel is classified, field by field, to produce RGBα values for each field, which are combined to form a single RGBα value. Optionally, the RGB values can be opacity weighted in the classifier stage 1620. The fields are then combined, and the classified result is written into one of the slice buffers, along with the associated gradient. If we are rendering in IC mode, that is, interpolation before classification, then voxel fields and the associated gradients 1602 are written to a pair of slice buffers two-at-a-time.

Slice Buffers

The classifier-interpolator of each pipeline has three pairs of slice buffers 1640, that is, six buffers in all. Each slice buffer holds 16×16 elements. The slice buffers are utilized as follows. At any given instant, two buffers are allocated for writing raw or classified input from the gradient estimator. The remaining four slice buffers are allocated for reading by the z-interpolation unit 1650. In the case of CI mode, where classified voxels and their gradients arrive one-at-a-time from the gradient estimator, the voxels are written into alternate slices buffers of the two allocated for writing so that voxels with the same values are written to the same slice buffer. The slices of the slice buffers are annotated with the permuted z-coordinates. In the case of IC mode, unclassified voxels and their gradients arrive two-at-a-time; these are written to two adjacent slice buffers simultaneously.

Eventually, the pair of slice buffers allocated for writing fills up. At this point, the classifier-interpolator signals the gradient estimator that pair of slice buffers is full. The gradient estimator then stops until this signal is removed. Eventually slices are consumed by the z-interpolation unit 1650, as described below. After all of the data in a pair of adjacent slices have been processed, the pair of associated buffers may be allocated for writing and the previously filled buffers are allocated for reading. Then, the signal to the gradient estimator is removed, and voxel and gradient data can begin flowing again. In practice, the gradient estimator stalls only when it gets far ahead of the z-interpolator 1650.

Interpolation in Z-Dimension

Note that above the z-interpolation unit operates with in permuted space 1651 coordinates. That is, voxel values and their associated gradients represent data and rates of change at integer points in permuted $(x_v, y_v, z_v)$ space.

The z-interpolation unit is the first step toward resampling the volume to sample space. The z-interpolation unit processes data one sample slice at a time, i.e., the unit reads voxels and gradients from two voxel slices of the slice buffers 1640, interpolates between them in the z-dimension, and stores the result into one of the 14×14 sample slice arrays 1660. The two slices are adjacent. In most cases, the slices overlap with the previously used slice 1660. However, the slices may not overlap when the slices in sample space are more than one voxel slice apart, i.e., when subsampling in the z-dimension. Z-interpolation requires one multiplication.

The output values of the z-interpolator have permuted x- and y-coordinates and a sample z-coordinate, i.e., coordinates of the form $(x_v, y_v, z_s)$. This is indicated in FIG. 16 by the notation "Hybrid Space" 1652.

Figure 17:
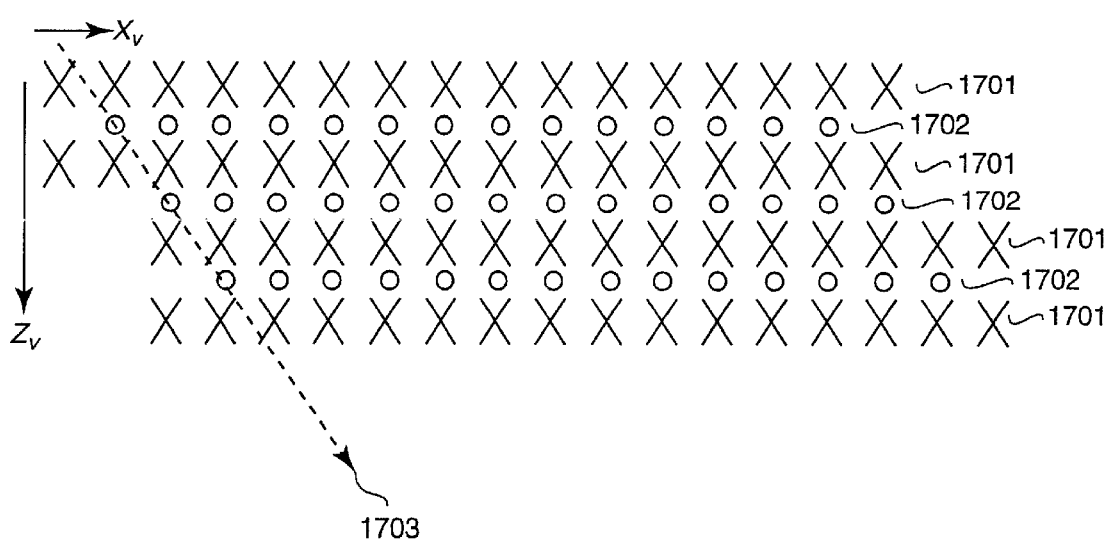
FIG. 17 are z-interpolations and a view direction.

Note that the threepairs of slice buffers in FIG. 16 have 16×16 elements in each slice. However, the sample buffers 1660 have only 14×14 elements. The sizes are a function of the section size (24×24). In object order rendering, a section of size sxs requires a (s+8)/2×(s+8)/2 slice buffer 1650, and a (s+4)/2×(s+4)/2 sample buffer 1660. That is, the z-interpolation unit 1650 writes at most fourteen elements in each row and column of the sample buffers 1660. This discrepancy is due to the angles of the rays, as illustrated in FIG. 17. Larger sizes may be required in xy-image order rendering to support the maximum section size. According, the invention allows variable section sizes.

FIG. 17 shows a cross section of four slices (planes) 1701 of voxel points and three interleaved slices (planes) 1702 of z-interpolated sample points. The voxel points are marked with x-characters, and the sample points are indicated by black circles o. Note, the planes of samples and voxels are parallel to each other. When the view direction 1703 is at its worst, i.e., a 45-degree angle, the offset between planes of voxels is such that only fourteen samples can be obtained from two rows or columns of sixteen voxels.

The z-interpolation stage 1650 operates by linearly interpolating each field of the raw or classified voxel independently, and also each of the three gradient components. The interpolation weight is an eight-bit number. The interpolated results of the voxel fields are rounded immediately, but one fractional low order bit is retained for the interpolated value of each gradient component.

This stage operates essentially the same as for object-order interpolation, and requires a single weighted sum multiply per interpolated value, Image order, as described in the art, requires four weighted sum multiplies in the Z dimension. This is because with object order and xy-image order the sample Z plane is parallel to the voxel Z plane, so adjacent samples share the same Z interpolation. With image order, the planes are not parallel so sharing cannot occur.

Interpolation in the X- and Y-Dimensions

The outputs 1603 of the z-interpolation stage are written into one of the two 14×14 sample buffers 1660. Meanwhile, the other sample buffer is read by the xy-interpolator 1670. Each element of the sample buffer 1660 therefore contains four 12-bit z-intepolated, raw or classified voxel fields plus three 11-bit gradient components, 9-bits, plus one low order bit, plus sign.

Taken together, the four 14×14 z-interpolated slice buffers 1640 of the four pipelines comprise a single 28×28 z-interpolated slice buffer with voxels arranged in an alternating pattern.

FIG. 18 shows a plane 1800 of voxel positions in the $x_v$-and $y_v$-dimensions 1801–1802 of permuted space. The voxels are represented by x-characters 1803. The voxels at positions marked with "A" correspond to the upper left quadrant of the mini-block at the top of FIG. 14. That is, these were processed by pipeline A. Similarly, voxels at positions marked B, C, and D were processed by pipelines B, C, and D, respectively.

The circles o 1804 represents ample points, i.e., points where rays intersect the sample slice. It can be seen that each sample point is surrounded by four voxels, one each from the sample buffer of pipelines A, B. C, and D respectively.

Therefore, each value at a sample point can be obtained by interpolating between values known to the four pipelines, respectively. This is independent of the sampling frequency in the x- and y-dimensions. That is, the xy-interpolation unit 1670 of each pipeline needs to read one z-interpolated value from its own sample buffer, plus one each from the sample buffers from three other pipelines via lines 1604. In effect, the sample buffers are shared among the four pipelines. Each pipeline writes only to its own sample buffer but reads from all four sample buffers.

The four pipelines interpolate four points in a 2×2 array called a stamp. One stamp 1805 is outlined with dashed lines. From this point on, all data flowing down the pipeline represent data at sample points along rays. The remaining stages process one stamp at a time. The rays pass perpendicularly through the center of pixels in the image plane.

Each output 1605 of the xy-interpolator comprises 78 bits, i.e., four interpolated voxel fields, raw or classified, rounded to twelve bits each, plus three interpolated gradient components rounded to ten bits each.

As an advantage of xy-image order rendering, interpolating in the xy-dimension takes only three weighted sum multiplications. Two weighted sum multiplications are needed to interpolate in Y and one is needed to interpolate those resulting values in X. This compares with two multipliers (one for Y and one for X) that are required in object order, since object order allows multiplications to be shared in the Y dimension. Therefore image order requires a total of seven multiplies, object order requires a total of three multiplies, and xy-image order requires a total of four multiplies.

When the rendering mode is IC, the data flowing from the xy-interpolation unit 1670 comprise interpolated voxel fields and interpolated gradient components. The last step in the classifier-interpolator is to transform these values into RGBα values and to apply the opacity-weighting function. This is done in sample space 1653. If the render mode is CI, then the transformation had already been applied to the fields of the raw voxels, and the color components were interpolated individually.

Thus, we provide a pipelined rendering method for volume data sets that is a major departure from the traditional shear-warp volume rendering technique. Our method combines the processing advantages of shear-warp, i.e., the ability to step through the volume in a very orderly way, slice-by-slice and a small number of multiplications (half the number that are required for image order rendering), with the visual advantages of true "image order" rendering.

The effect is that we cast one ray per pixel of the final image, as in true image order. But we position the samples along each ray in slices that mimic those of shear-warp order. This provides a much higher image quality and much better performance than the prior art shear-warp technique, and furthermore we eliminate the warp step entirely. Our invention also enables the rendering of embed polygon geometry in volume data sets.

It can also be seen that our pipeline organization also supports processing according to the shear-warp order. In this cases, the stamps 1805 are always aligned with the axes of the volume, and therefore of the slices. Shear-warp order is achieved by setting $dy_s dx_s = dx_y dy_s = 0$ in the transformation $R^{-1}$ of Equation 17.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claims:

1. A method for correcting gradients of graphic data, comprising:
    arranging the graphic data on a plurality of irregular spaced grid points;
    estimating a vector denoting a spatial rate of change of the graphic data at each irregular spaced grid point; and
    applying a correction matrix to each vector to determine a corrected gradient at each irregular spaced grid point.

2. The method of claim 1, further comprising:
    arranging the graphic data within a first dimension at a first constant spacing; and
    arranging the graphic data within a second dimension at a second constant spacing different from the first constant spacing to arrange the plurality of irregular spaced grid points anisotopically.

3. The method of claim 2 wherein the first dimension is at a right angle to the second dimension.

4. The method of claim 1, further comprising:
    arranging the graphic data within a first dimension at a first constant spacing; and
    arranging the graphic data within a second dimension oblique to the first dimension at a second constant spacing to shear the plurality of irregular spaced grid points.

5. The method of claim 4 wherein the first spacing is different from the second spacing.

6. The method of claim 4 wherein the plurality of irregular spaced grid points are anisotropically arranged and further comprising:
    arranging the graphic data within a first dimension and second dimension at a first constant spacing; and
    arranging the graphic data within a third dimension at a second constant spacing different from the first constant spacing.

7. The method of claim 1 wherein the plurality of irregular spaced grid points are sheared and further comprising:
    arranging the graphic data within a first dimension at a first constant spacing;
    arranging the graphic data within a second dimension at right angles to the first dimension at a second constant spacing; and
    arranging the graphic data within a third dimension oblique to the first dimension and the second dimension at a second constant spacing.

8. The method of claim 1 wherein the graphic data is a volume data set including a plurality of voxels.

9. The method of claim 1 further wherein the vector is estimated by taking central differences of the graphic at neighboring grid points.

10. The method of claim 1 wherein the application of the correction matrix results in a linear transformation that reverses effects of the irregular spacing of the grid points.

11. The method of claim 1, wherein the graphic data comprise a volume data set including a plurality of voxels, each of the plurality of irregular spaced grid points corresponding to a different voxel of the volume data set.

12. A method comprising:
    inputting graphic data arranged on a plurality of irregular spaced grid points;
    estimating a gradient of the graphic data at each irregular spaced grid point; and
    applying a correction matrix to each gradient to determine a corrected gradient at each irregular spaced grid point.

13. The method of claim 12 wherein the graphic data comprise a volume data set including a plurality of voxels, each of the plurality of irregular spaced grid points corresponding to a different voxel of the volume data set.

14. The method of claim 12 further comprising:
    arranging the graphic data within a first dimension at a first constant spacing; and
    arranging the graphic data within a second dimension at a second constant spacing different from the first constant spacing to arrange the plurality of irregular spaced grid points anisotropically.

15. The method of claim 14 wherein the first dimension is that right angle to the second dimension.

16. The method of claim 12 further comprising:
    arranging the graphic data within a first dimension at a first constant spacing; and
    arranging the graphic data within a second dimension oblique to the first dimension at a second constant spacing to shear the plurality of irregular spaced grid points.

17. The method of claim 16 wherein the first spacing is different from the second spacing.

18. The method of claim 12 further comprising:
    arranging the graphic data within a first dimension and second dimension at a first constant spacing; and
    arranging the graphic data within a third dimension at a second constant spacing different from the first constant spacing.

19. The method of claim 12 further comprising:
    arranging the graphic data within a first dimension and within a second dimension, the second dimension at a right angle to the first dimension; and
    arranging the graphic data within a third dimension oblique to the first dimension and the second dimension.

20. A method for correcting gradients of graphic data in a volume rendering system, the method comprising:
    inputting a volume data set including a plurality of irregular spaced voxels;
    estimating a vector denoting a spatial rate of change of the volume data set at each of the voxels; and
    applying a correction matrix to each vector to determine a corrected gradient at each of the voxels.

21. The method of claim 20, wherein the voxels are arranged within a first dimension, a second dimension and a third dimension, and wherein a constant spacing of voxels in the third dimension is different from a constant spacing of the voxels in the first dimension and the second dimension.

22. The method of claim 20, wherein the voxels are arranged within a first dimension, a second dimension and a third dimension, wherein one of the first, second and third dimensions is oblique to the other two of said first, second and third dimensions, while said other two of the first, second and third dimensions are at a right angle to each other.

23. A rendering engine comprising:
   a sequencer;
   a memory interface coupled to the sequencer;
   a bus logic coupled to the sequencer; and
   a plurality of parallel rendering pipelines coupled to the sequencer, each of the rendering pipelines including a plurality of stages, the plurality of stages including a gradient estimation stage to estimate gradients for a volume data set that includes a plurality of voxels by estimating a gradient vector at each of the voxels, and to apply a correction matrix to each gradient vector to determine a corrected gradient at each of the voxels.

24. The rendering engine of claim 23, wherein the voxels are arranged within a first dimension and a second dimension at a first constant spacing, and wherein the voxels are further arranged within a third dimension at a second constant spacing different from the first constant spacing.

25. The rendering engine of claim 23, wherein the voxels are arranged within a first dimension and a second dimension, the second dimension at a right angle to the first dimension, and wherein the voxels are further arranged within a third dimension oblique to the first dimension and the second dimension.

26. An apparatus for correcting gradients of graphic data, comprising:
   means for inputting graphic data arranged on a plurality of irregular spaced grid points;
   means for estimating a gradient representing a spatial rate of change of the graphic data at each irregular spaced grid point; and
   means for applying a correction matrix to each gradient to determine a corrected gradient at each irregular spaced grid point.

* * * * *